US011473290B2

(12) United States Patent
Miacolo et al.

(10) Patent No.: US 11,473,290 B2
(45) Date of Patent: Oct. 18, 2022

(54) WINDOW FOR EXPANDABLE SHELTER

(71) Applicant: Berg Companies Inc., Spokane, WA (US)

(72) Inventors: Paul Miacolo, Newman Lake, WA (US); Paul Gorka, Spokane, WA (US)

(73) Assignee: Berg Companies, Inc., Spokane, WA (US)

( * ) Notice: Subject to any disclaimer, the term of this patent is extended or adjusted under 35 U.S.C. 154(b) by 82 days.

(21) Appl. No.: 16/773,009

(22) Filed: Jan. 27, 2020

(65) Prior Publication Data

US 2020/0240133 A1 Jul. 30, 2020

Related U.S. Application Data

(60) Provisional application No. 62/797,504, filed on Jan. 28, 2019.

(51) Int. Cl.

| | |
|---|---|
| *E04B 1/343* | (2006.01) |
| *E04H 1/12* | (2006.01) |
| *E06B 9/34* | (2006.01) |
| *E06B 9/262* | (2006.01) |
| *E04B 1/344* | (2006.01) |

(52) U.S. Cl.
CPC ........ *E04B 1/34321* (2013.01); *E04B 1/3442* (2013.01); *E04H 1/1205* (2013.01); *E06B 9/262* (2013.01); *E06B 9/34* (2013.01)

(58) Field of Classification Search
CPC .............. E04B 1/34305; E04B 1/3431; E04B 1/34315; E04B 1/34321; E04B 1/344; E04B 1/3441; E04B 1/3442; E04B 1/3444; E04B 1/3445; E06B 9/26; E06B 9/262; E06B 2009/2622; E06B 9/34; E06B 9/32; E06B 9/322; E06B 9/58; E06B 2009/583
USPC ......................................................... 296/83
See application file for complete search history.

(56) References Cited

U.S. PATENT DOCUMENTS

| | | | | |
|---|---|---|---|---|
| 2,582,276 | A | * | 1/1952 | Powers .................. A47H 23/01 160/243 |
| 4,202,395 | A | * | 5/1980 | Heck ......................... E06B 9/68 160/279 |
| 5,323,831 | A | * | 6/1994 | Manthei .................. E06B 9/581 160/264 |
| 5,913,564 | A | * | 6/1999 | Stewart ..................... B60J 1/14 296/141 |
| 8,622,066 | B2 | | 1/2014 | Dolsby et al. |
| 8,650,806 | B1 | | 2/2014 | Condie |
| 9,896,883 | B1 | * | 2/2018 | Cheng ....................... E06B 9/50 |
| 2005/0082019 | A1 | * | 4/2005 | Nien ....................... E06B 9/322 160/178.2 |

(Continued)

*Primary Examiner* — William V Gilbert
(74) *Attorney, Agent, or Firm* — Fay Sharpe LLP

(57) ABSTRACT

An expandable shelter includes a ceiling panel that unfolds from a top, a floor panel that unfolds from a bottom, a flexible sidewall having a first end coupled to the ceiling panel and a second end coupled to the floor panel. The flexible sidewall further includes a window disposed in the sidewall, and a shade to cover the window. The shade is configured to transition between a closed state and an open state. A first line and a second line couple to the shade, extend between an interior of the expandable shelter and an exterior of the expandable shelter, and are usable to transition the shade between the closed state and the open state.

11 Claims, 16 Drawing Sheets

(56) References Cited

U.S. PATENT DOCUMENTS

| | | | |
|---|---|---|---|
| 2006/0237144 A1* | 10/2006 | Cheng | E06B 9/322 160/84.04 |
| 2009/0038762 A1* | 2/2009 | Hsieh | E06B 9/388 160/168.1 R |
| 2013/0263527 A1 | 10/2013 | Barret et al. | |
| 2014/0116486 A1 | 5/2014 | Combs et al. | |
| 2014/0278801 A1 | 9/2014 | Barrett et al. | |
| 2015/0315808 A1 | 11/2015 | Cronk | |
| 2017/0058556 A1 | 3/2017 | Lilly, II et al. | |

\* cited by examiner

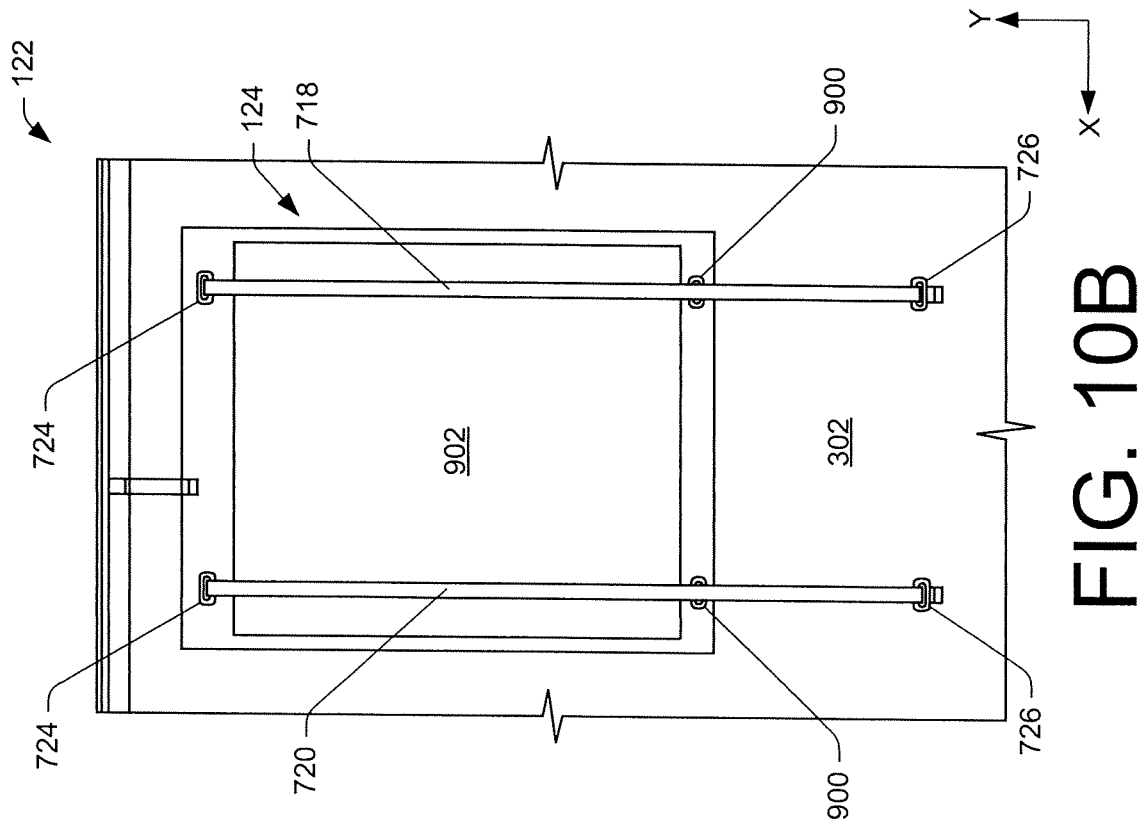
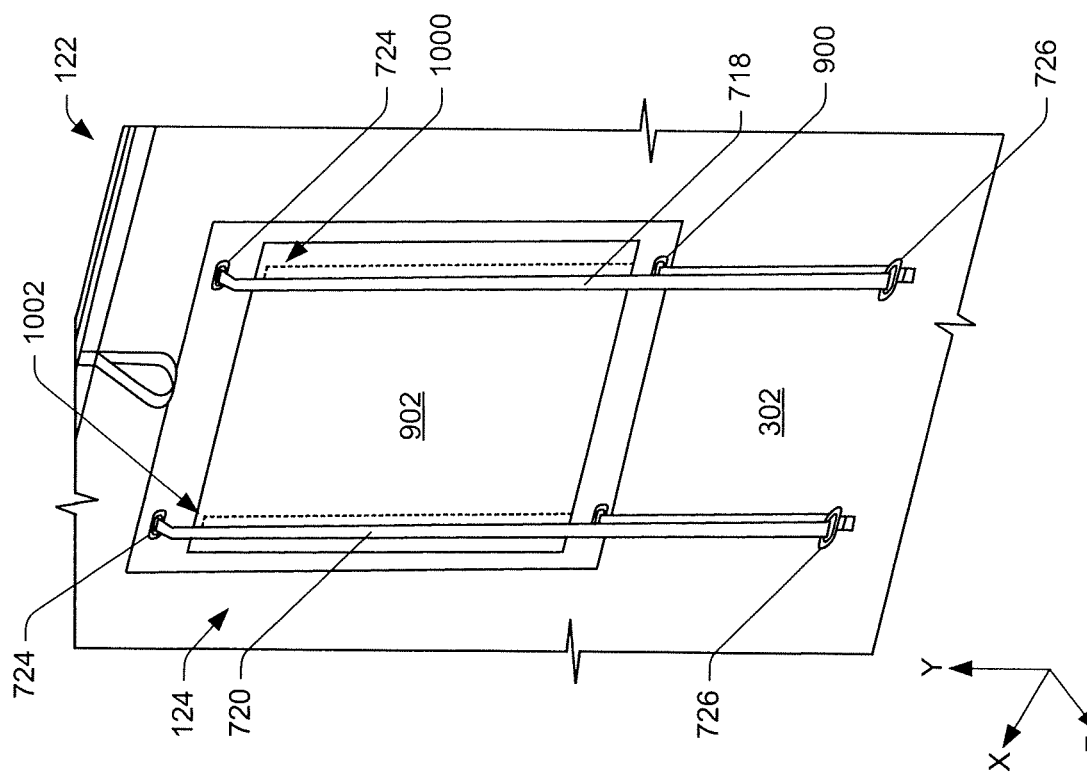

WINDOW FOR EXPANDABLE SHELTER

CROSS-REFERENCE TO RELATED APPLICATION

This application claims priority from and benefit of the filing date of U.S. Provisional Application Ser. No. 62/797,504 filed Jan. 28, 2019, and the entire disclosure of said provisional application is hereby expressly incorporated by referenced into the present specification.

BACKGROUND

Expandable shelters may accommodate a range of different environments and uses. For instance, expandable shelters may be used as barracks, field hospitals, mess halls, kitchens, relief shelters, communication centers, laboratories, and so forth. When deployed, expandable shelters may expand to create a significantly larger operating footprint. To accommodate for their range of uses and provide entry into an interior, expandable shelters may include doors, windows, or other access points. However, these access points may adversely impact insulating and sealing the expandable shelter. Additionally, existing expandable shelters may lack access points that are conveniently deployed and stowed.

SUMMARY

In accordance with one aspect of the present disclosure, a wall is configured to couple to a shelter. The wall includes a substantially transparent material. A first slot and a second slot are disposed above the substantially transparent material. A third slot and a fourth slot are disposed below the substantially transparent material. A shade is configured to transition between a closed state and an open state. The wall includes a first line including a first end coupled to the shade and a second end extending through the first slot, through a first ring coupled to the wall, and through the third slot, wherein the second end of the first line is coupled to the shade. The wall further includes a second line including a first end coupled to the shade and a second end extending through the second slot, through a second ring coupled to the wall, and through the fourth slot, wherein the second end of the second line is coupled to the shade such that actuating the first line and the second line transitions the shade between the closed state and the open state.

In accordance with another aspect of the present development, an expandable shelter includes a top and a ceiling panel that unfolds from the top. The shelter further includes a bottom and a floor panel that unfolds from the bottom. The shelter also includes a flexible sidewall including a first end coupled to the ceiling panel, a second end opposite the first end, wherein the second end is coupled to the floor panel. A wall portion extends between the first end and the second end. A window is disposed in the wall portion, and a shade is disposed over the window. The shade is configured to transition between a closed state and an open state. A first line and a second line are coupled to the shade. The first line and the second line each extend between an interior of the expandable shelter and an exterior of the expandable shelter such that actuating the first line and the second line transitions the shade between the closed state and the open state.

In accordance with a further aspect of the present disclosure, an expandable system includes a top, a bottom, and a flexible sidewall coupled to at least one of the top or the bottom. The flexible sidewall includes an interior surface and an exterior surface opposite the interior surface. A window is disposed on the flexible sidewall. The system also includes a shade including an interior surface and an exterior surface opposite the interior surface. The shade is configured to transition between a closed state and open state via a first line and a second line, wherein actuating the first line and the second line in a first direction transitions the shade from the closed state to the open state and actuating the first line and the second line in a second direction transitions the shade from the open state to the closed state. In the closed state, the interior surface of the shade couples to the exterior surface of the flexible sidewall.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 10A is a rear perspective view of an example window coupled to an example wall of the example expandable shelter of FIG. 1, showing the example window in a closed state.

FIG. 10B is a rear view of an example window coupled to an example wall of the example expandable shelter of FIG. 1, showing the example window in a closed state.

DETAILED DESCRIPTION

Figure 1A:
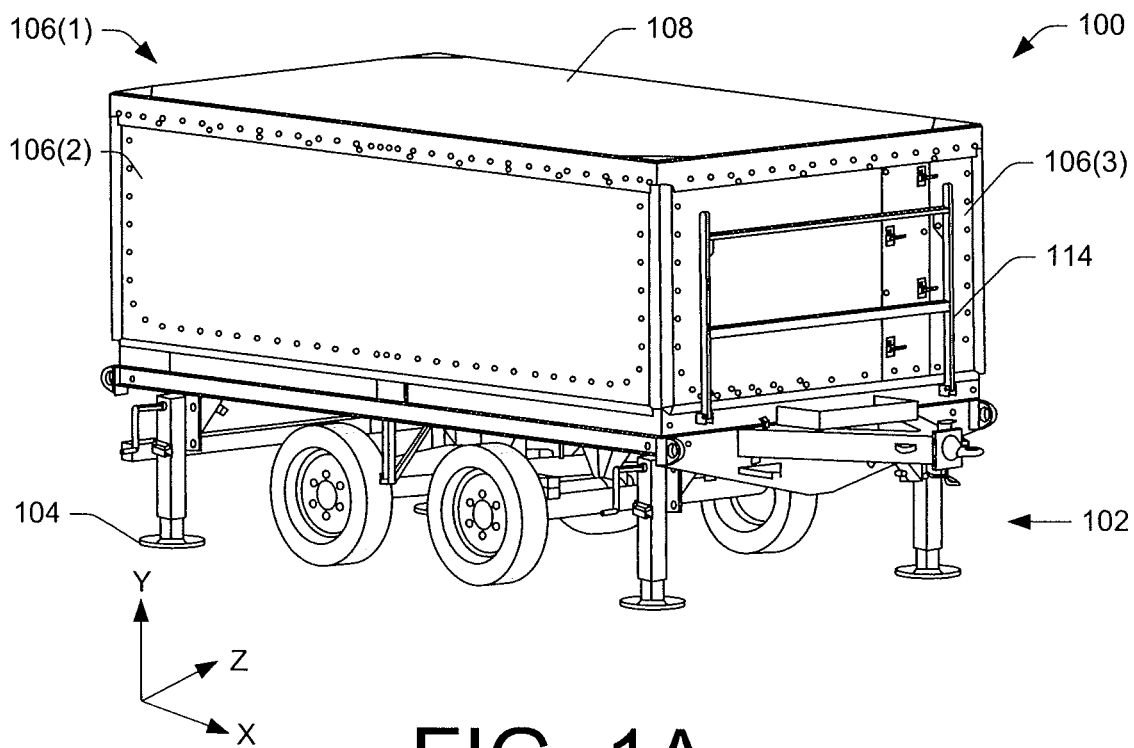
FIG. 1A is a perspective view of an example expandable shelter, showing the example expandable shelter in a stowed state.

As discussed above, existing expandable shelters, or other moveable-type shelters, may include windows to provide light, access, and/or ventilation into an interior of the expandable shelter. However, these windows may not easily collapse when stowing the expandable shelter. Conventional windows may also lack efficient mechanisms to open and close the window or to raise and lower a shade of the window. Challenges may also arise in environmentally sealing the windows and/or the interior of the expandable shelter (e.g., to waterproof, weatherproof, prevent light leakage, etc.).

In light of the above, this application describes a window for use with an expandable shelter. In some instances, the window may be integrated within or couple to a canvas or wall, which may enclose an interior of the expandable shelter and/or may seal the interior of the expandable shelter from water, debris, and/or light. The window may include a cover, blind, or shade that couples or is disposed on the exterior of the expandable shelter. The shade may transition between a lowered, shut, or closed state and a retracted, raised, or open state. In the closed state, the shade may assist in environmentally sealing the interior of the expandable shelter. Conversely, in the open state, the interior may be exposed to allow access, light, and/or visibility into and out of the expandable shelter. In some examples, the window may also include a sheet of substantially transparent material and/or screen to prevent debris from entering the interior of the expandable shelter when the shade is in the open state.

The shade may conveniently transition between the closed state and the open state. In some instances, the shade may transition between the closed state and the open state through actuating one or more lines, which may include any tensile member such as a strap, cord, rope, filament, or the like. For instance, the one or more lines may include a first line and a second line disposed at or near opposing lateral sides of the shade. The first line and the second line may route from within the interior of the expandable shelter and couple to the shade located on the exterior of the expandable shelter. Actuating (e.g., pulling) the first line and the second line in a first direction may open the shade, while actuating (e.g., pulling) the first line and the second line in a second, opposite direction, may close the shade. As such, a user may open and close the shade within the interior of the expandable shelter.

The first line and the second line may extend from within the interior of the expandable shelter and may extend along an exterior surface of the shade, from a top end of the shade to a bottom end of the shade. The first line and the second line may wrap around the bottom end of the shade and may extend along an interior surface of the shade to the top end. Respective first ends of the first line and the second line may couple to the top end of the shade. Respective second ends of the first line and the second line may feed (or loop through) pulleys or other fittings (e.g., rings, loops, buckles, etc.) within the interior of the expandable shelter and may couple to the interior surface of the shade at the bottom end of the shade. For instance, after being fed through the fittings, the respective second ends of the first line and the second line may be disposed through one or more slots in the window or the wall and couple to the bottom end of the shade.

To illustrate the opening and closing of the shade, actuating the first line and the second line in the first direction (e.g., pulling downward) may raise the shade in an upward vertical direction to expose the interior of the expandable shelter. That is, as the first line and the second line are disposed over the bottom end of the shade, pulling the first line and the second line may draw the bottom end of the shade towards a top of the window. In some instances, pulling the first line and the second line may cause the material of the shade to spool upon itself and roll up towards the top of the window. In this sense, the shade may expose a sheet of substantially transparent material, a screen, or an opening of the window. When raised to a desired height, the shade may secure to the window or other portions of the expandable shelter to prevent the shade from closing. Additionally, the shade may include structural features (e.g., slats) that maintain the lateral width of the shade and allow the shade to conveniently roll and unroll to the open and closed state, respectively.

Consequently, as the shade opens and as the second ends of the first line and the second line are coupled to the bottom end of the shade, the first line and the second line may spool or roll up with or within the material of the shade. Actuating the first line and the second line in the second direction (e.g., pulling upward) may lower the shade in a downward vertical direction to limit visibility into the interior or environmentally insulate the interior of the expandable shelter. In other words, in the open state, as the first line and the second line are wrapped with or within the material of the shade, actuating the first line and the second line in an opposite direction may release the shade from the open state and may unroll the shade over the window. Accordingly, depending on which direction the first line and the second line are pulled, the shade may either open or close.

In some instances, fasteners, such as hook-and loop, magnets, or buttons may be used to secure the shade in the closed state. However, upon actuation of the first line and the second line in the first direction to open the shade, the shade may release from the fasteners and transition to the open state. When sealed in the closed state, the shade may prevent substantially all light from exiting the interior to reduce a visibility footprint of the expandable shelter.

As noted above, the first line and the second line may extend into the interior to allow a user to open and close the shade from within the interior of the expandable shelter. Within the interior, the first line and the second line, in the closed state and the open state, may remain taught or flush against the interior of the wall so as to avoid dangling loosely, getting caught, or being a tripping hazard. Additionally, as noted above, the first line and the second line may extend between the interior of the expandable shelter and an exterior of the expandable shelter through slots in the wall or portions of the window. In some instances, the slots may be disposed interior to a perimeter of the window or the shade. As such, in the closed state, the shade may be disposed over the slots to prevent light from exiting the interior or debris from entering the interior.

In some instances, the window may be configured to stow and deploy with the wall. That is, as the expandable shelter is configured to transition between a collapsed or stowed state, such as when the expandable shelter is transported, and an expanded or deployed state, such as when the expandable shelter is set-up for use, window(s) according to this application may conveniently stow and deploy with or within the wall of the expandable shelter. As such, the windows according to this application may eliminate a need to install windows when deploying the expandable shelter and may eliminate a need to remove the windows from the wall while stowing the expandable shelter. Rather, the windows according to this application may conveniently collapse and fold within the wall of the expandable shelter in the stowed state and may conveniently unfold with the wall of the expandable shelter when the expandable shelter deploys. As such, the materials of the shade and/or window may include flexible materials (e.g., fabrics, plastics, etc.) that allow the wall to conveniently unpack and pack While the instant application discusses a window for use with an expandable shelter, features of the window may be integrated into other access points of an expandable shelter. For instance, the features discussed herein may find use in ventilation ports, doors, skylights, and so forth. Additionally, or alternatively, the window (or other access points) may be coupled to other portions of an expandable shelter other than a wall, such as a ceiling or floor, for instance. Moreover, the window may be integrated with other type shelters than discussed herein, such as a tent, awning, carport, and so forth.

Example Transition from Stowed State to Deployed State

FIGS. 1A-1E illustrate a progressive deployment of an expandable shelter 100 from a stowed state to a deployed state. Beginning with FIG. 1A, the expandable shelter 100 is shown in the stowed state. In some instances, the expandable shelter 100 may attach, integrate, or otherwise couple to a trailer 102, which may transport the expandable shelter 100 to a remote site for deployment. The trailer 102 may include common features that permit transport, such as brakes, frames, wheels, towing mechanisms (e.g., tongue), and so forth. Although this application discusses the expandable shelter 100 in use with the trailer 102, features of the expandable shelter 100 may be usable in other designs as well, with or without a trailer.

As illustrated, in the stowed state, the expandable shelter 100 may resemble a compact enclosure that resides within a perimeter of the trailer 102. In some instances, in the stowed state, the expandable shelter 100 may have dimensions of substantially 96"×substantially 96"×substantially 242". In some examples, the trailer 102 may include also leveling jacks 104 that deploy, level, and/or support the expandable shelter 100.

Ceiling panels 106(1), 106(2), and 106(3) (hereinafter, collectively "ceiling panels 106") may define at least a portion of an exterior of the expandable shelter 100. In some instances, the ceiling panels 106 may align with the perimeter of the trailer 102 in the stowed state. A top ceiling panel 108 may define a top of the expandable shelter 100. In some instances, the ceiling panels 106 may couple to portions of the top ceiling panel 108 to secure the ceiling panels 106 to the expandable shelter 100.

The ceiling panels 106 may include a plurality of hard and/or soft panels that fold or otherwise collapse into a frame of the expandable shelter 100, and unfold during deployment of the expandable shelter 100. In some instances, the ceiling panels 106 may be configured to fold within a perimeter of the trailer 102. From the illustration shown in FIG. 1A, and as shown herein, the ceiling panels 106 may extend outward to transition from a stowed state to a deployed state.

Figure 1B:
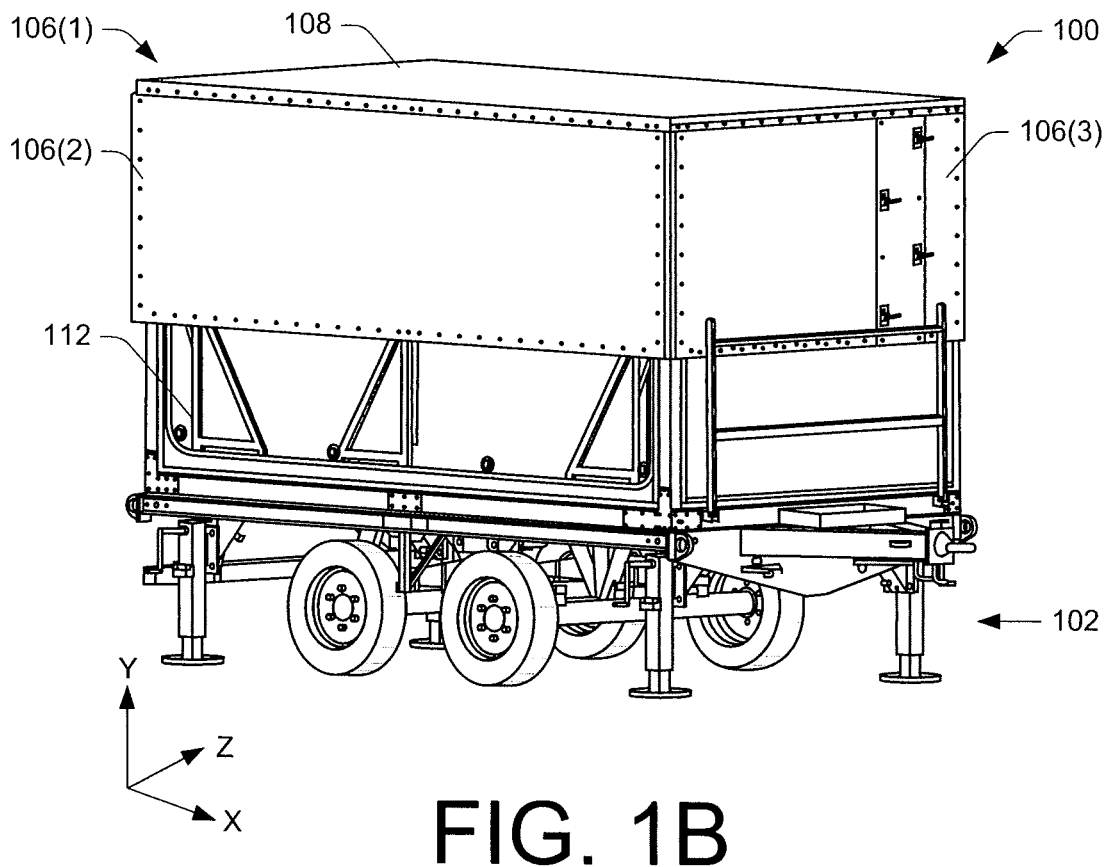
FIG. 1B is a perspective view of the example expandable shelter of FIG. 1, showing the example expandable shelter in a partially-deployed state.
Figure 1C:
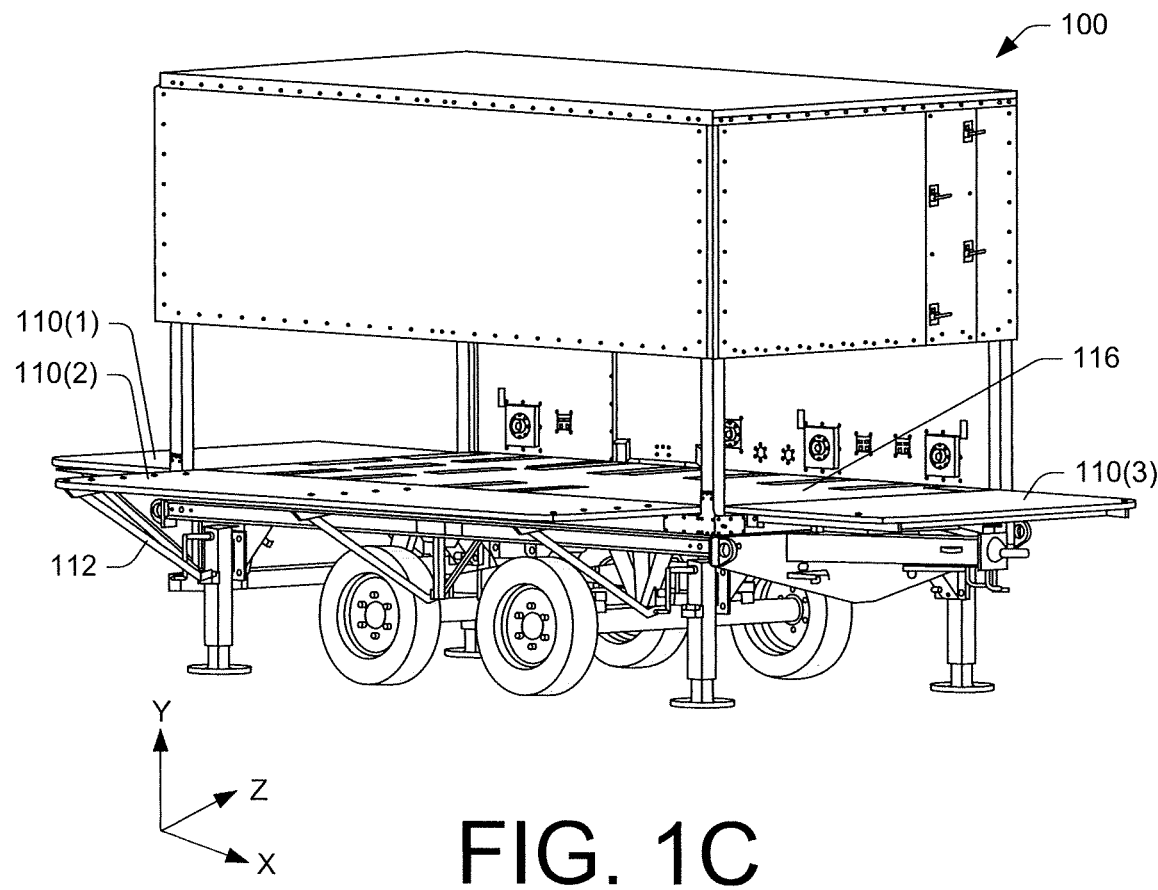
FIG. 1C is a perspective view of the example expandable shelter of FIG. 1, showing the example expandable shelter in a partially-deployed state.

FIG. 1B illustrates a portion of the expandable shelter 100 in a partially deployed state. For instance, FIG. 1B illustrates an upper portion of the expandable shelter 100 extending from a lower portion of the expandable shelter 100. The expandable shelter 100 may include frames integrated with or coupled to the trailer 102 that transition the expandable shelter 100 between stowed and deployed states through actuating a lifting mechanism. For instance, the expandable shelter 100 may include an upper frame that extends from a lower frame via an actuation of the lifting mechanism. With reference to the Cartesian (X-Y-Z) coordinate system, the expandable shelter 100 may deploy in the Y-direction.

In some instances, portions of the upper frame and the lower frame may collapse within one another to reduce an operational footprint and/or volume of the expandable shelter 100 in the stowed state. For instance, in the stowed state, posts of the upper frame may be disposed over posts of the lower frame. In transitioning the expandable shelter 100 to the deployed state, the posts of the upper frame may slide over an external surface of the posts of the lower frame, thereby raising the upper frame from the lower frame. In this sense, the posts of the upper frame and the posts of the lower frame may act as telescopic system that contract within one another in the stowed state and expand apart in the deployed state.

The lifting mechanism may raise the upper frame and in doing so, shown in FIG. 1B, the ceiling panels 106 and the top ceiling panel 108 are translated in the upward Y-direction, away from the trailer 102. Through lifting the upper frame, other components of the expandable shelter 100 may be configurable to the deployed state. The lifting mechanism may balance and suspend loads of the expandable shelter 100 such that the expandable shelter 100 may deploy and stow at a constant, controlled rate. The lifting mechanism may also maintain their position when the expandable shelter 100 is deployed, stowed, or between stowed and deployed states.

In some instances, the lifting mechanism may include a system of jack screw assemblies (e.g., ACME® screw), shafts, and gear drives (e.g., worm gears, bevel gears, rack and pinions, spiral bevel gears, helical gears, spur gears, internal gears, or any combination thereof) that deploy and stow corners of the expandable shelter 100 in unison. Additionally, or alternatively, the expandable shelter 100 may include hydraulic pumps, air compressors, manifolds, and/or conduit/lines that actuate hydraulic and/or pneumatic cylinders disposed at corners of the expandable shelter 100. These hydraulic or pneumatic cylinders may operate to transition the expandable shelter 100 between stowed and deployed states. In some instances, the lifting mechanism may actuate via an input received from a keyed shaft, a knob, an actuator, a button, a lever, a socket (with any non-circular receptacle shape), or any other component capable of being engaged by a driver (e.g., by a lever, wrench, ratchet, crank, electric motor, drill motor, etc.). The input may provide mechanical, electrical, hydraulic, pneumatic, or other inputs that cause the lifting mechanism or the linear actuators to stow and deploy the expandable shelter 100.

FIG. IC illustrates floor panels 110(1), 110(2), and 110(3) (hereinafter, collectively "floor panels 110") unfolding from a stowed state into the deployed state. The floor panels 110 may include a plurality of hard and/or soft panels that fold or otherwise collapse into a frame of the expandable shelter 100, and unfold during deployment. In some instances, the floor panels 110 may be configured to fold within a perimeter of the trailer 102. To illustrate, and referencing both FIG. 1B and FIG. 1C, the floor panels 110 may fold outward from the stowed state (FIG. 1B) to the deployed state (FIG. 1C) in X- and Z-directions, respectively. In the deployed state, the floor panels 110 may abut, contact, engage, couple to, and/or brace against portions of the trailer 102. For instance, returning briefly to FIG. 1B, some of the floor panels 110 (e.g., the floor panel 110(2)) may include braces 112 disposed on an underside of the floor panels 110. When the floor panels 110 deploy, the braces 112 may brace against the trailer 102 (or the ground or other portions of the expandable shelter 100) to support to the floor panels 110. Some of the floor panels 110 (e.g., the floor panel 110(3)) may brace against the trailer 102 through other mounts, brackets, or supports 114 (see, e.g., FIG. 1A). For instance, the support 114 may fold downward in the Y-direction to rest on a tongue of the trailer 102 and the floor panel 110(3) may brace against the support 114 when deployed. In the deployed state, the floor panels 110 may fold to positions substantially parallel and/or substantially co-planar with a floor 116 of the expandable shelter. In the deployed state, the expandable shelter 100 may have an increased operational footprint and/or volume.

FIG. ID illustrates the ceiling panels 106 of the expandable shelter 100 in the deployed state. For instance, the ceiling panels 106 may rotate outward from their stowed state (see FIG. 1C) in X- and Z-directions and brace or couple to portions of the expandable shelter 100. In some instances, to support the ceiling panels 106 in their deployed state, a plurality of poles 117 may extend between the floor panels 110 and the ceiling panels 106. The poles 117 may removably couple to the ceiling panels 106 and the floor panels 110 and brace the ceiling panels 106 in respective deployed states. Deploying the floor panels 110 and the ceiling panels 106 exposes an interior 118 of the expandable shelter 100. To transition the expandable shelter 100 to the stowed state, the poles 117 may be removed and the ceiling panels 106 may fold downward in the Y-direction, as shown in FIG. IC.

In the deployed state, the ceiling panels 106 may fold to a position substantially parallel or substantially co-planar with the top ceiling panel 108. In some instances, in the deployed state, the ceiling panels 106 and the floor panels 110 may be substantially parallel with one another. In some instances, the ceiling panels 106 may slope away from the expandable shelter 100 to repel water away from the interior 118. In that case, the ceiling panels 106 may not be parallel with the floor panels 110. For example, the ceiling panels 106 may be positioned at an oblique angle (e.g., between 1 degree and 20 degrees) relative to the floor panels 110.

In some instances, through utilizing hard-sided panels for the ceiling panels 106 and the floor panels 110, the expandable shelter 100 may quickly deploy and with considerable strength and rigidity. The ceiling panels 106 and the floor panels 110 may include structurally insulated panels (SIPs) which, in some instances, may include at least a layer of insulation material sandwiched between two thin outer skins made of wood, fiberglass, carbon fiber, metal, and/or other structural materials.

Additionally, the expandable shelter 100 may include a hard-sided wall 120 configured to collapse and expand between stowed and deployed states. In other words, the ceiling panels 106 and the floor panels 110 may unfold/fold from less than all sides of the expandable shelter 100 and, in some instances, at least a portion of the perimeter of the expandable shelter 100 may be defined by the hard-sided wall 120.

Figure 1D:
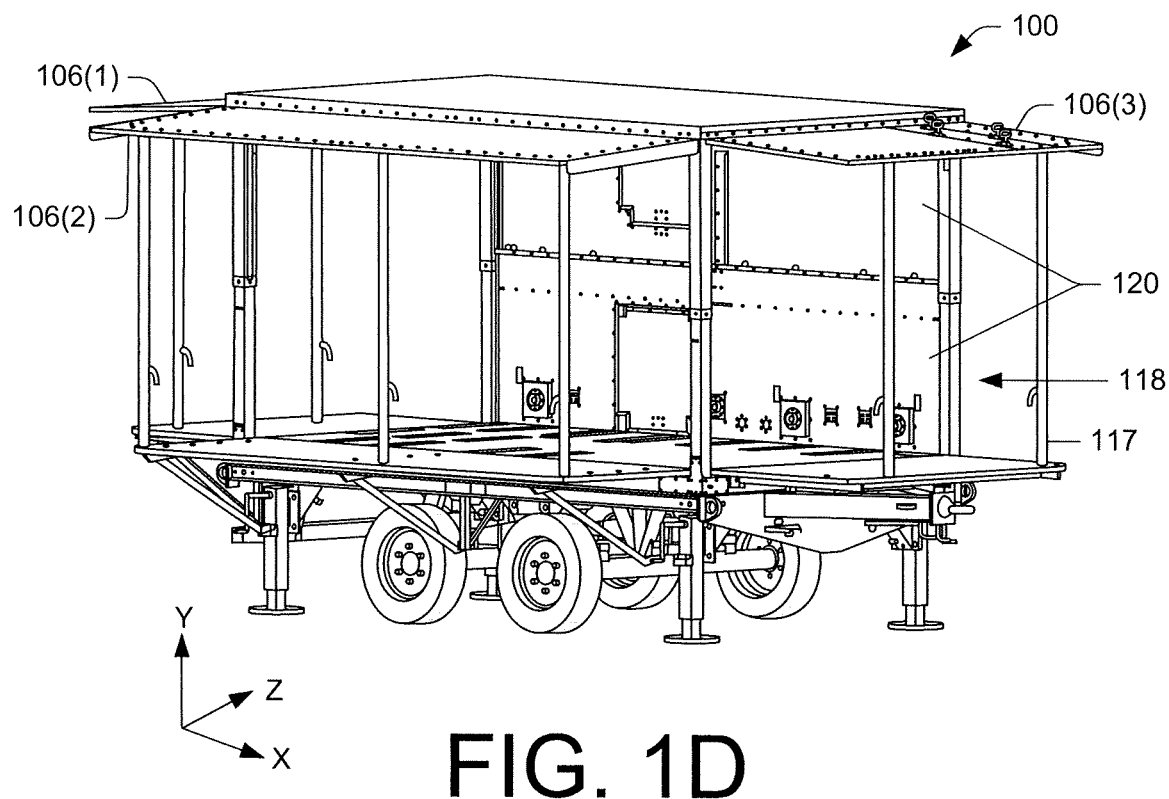
FIG. 1D is a perspective view of the example expandable shelter of FIG. 1, showing the example expandable shelter in a partially-deployed state.
Figure 1E:
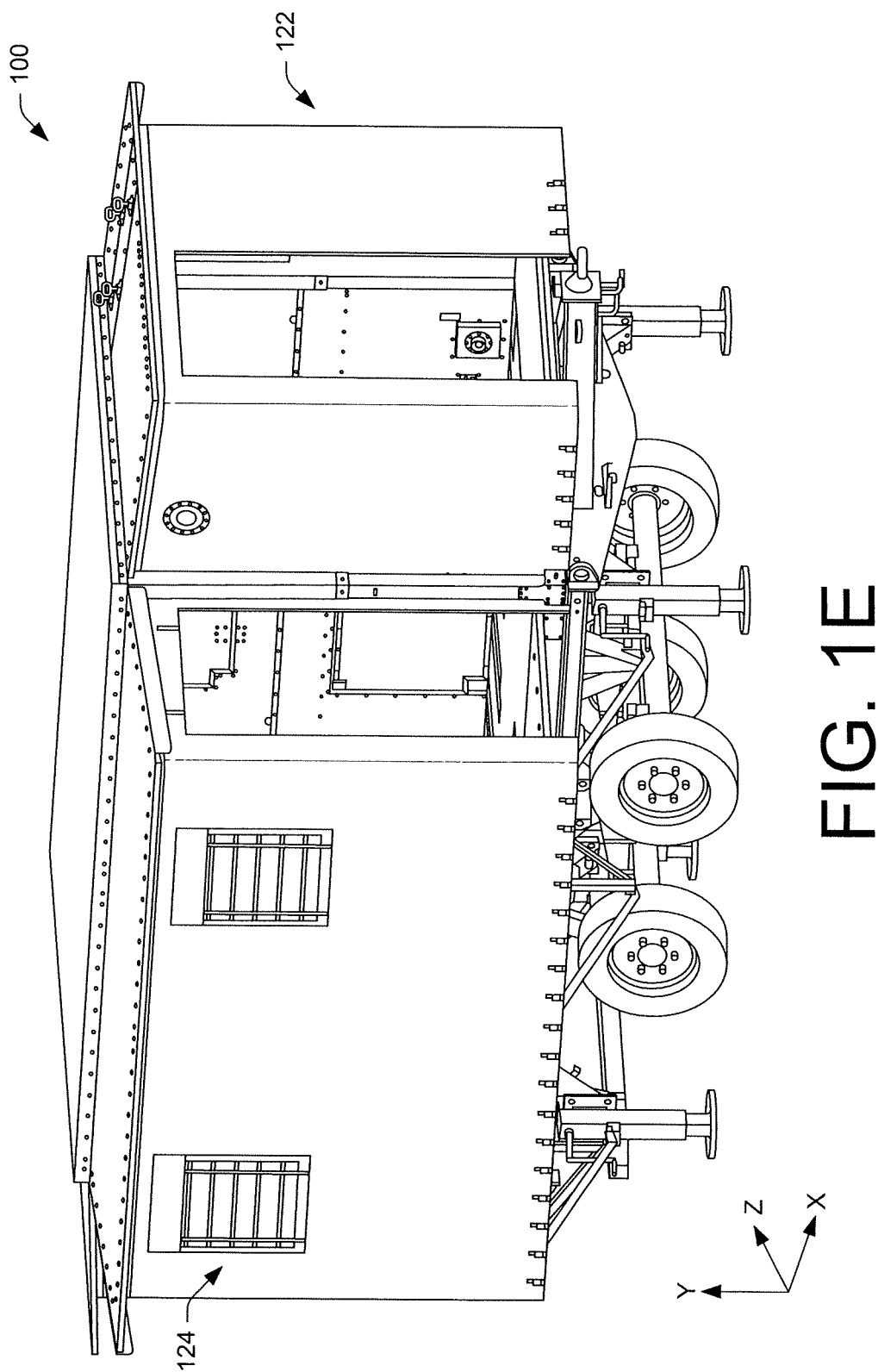
FIG. 1E is a perspective view of the example expandable shelter of FIG. 1, showing the example expandable shelter in a deployed state.

FIG. 1E illustrates a wall 122 that encloses the interior 118. The wall 122 may continuously extend around the perimeter of the expandable shelter 100 in the deployed state to environmentally insulate and seal (e.g., waterproof, weatherproof, prevent light leakage, etc.) the interior 118. The wall 122 may couple to portions of the expandable shelter 100 through a combination of straps (e.g., rope, chord, cable, etc.), hangers, tie-downs (e.g., ratchet, cambuckle, etc.) and a system of channels (e.g., U-channel, C-Channel, etc.), and fasteners (e.g., bead, piping, slides, inserts, boltrope, etc.). For instance, the wall 122 may couple to the ceiling panels 106 through a system of channels disposed on respective ceiling panels 106. The coupling of the wall 122 to the ceiling panels 106 may be within (i.e., spaced inwardly from) an outer perimeter of the ceiling panels 106 to prevent water permeating into the interior 118. Additionally, the wall 122 may be disposed over (e.g., drape) a perimeter of the floor panels 110 to direct water, moisture, or other debris away from the interior 118. In some instances, the wall 122 may couple to the floor panels 110, or other portions of the expandable shelter 100, through tie-downs and/or straps. By tightening the tie-downs, the wall 122 may pull taut.

In some instances, the wall 122 may extend around less than all sides of the expandable shelter 100. For instance, certain sides of the expandable shelter 100 may include the hard-sided wall 120 while other sides of the expandable shelter 100 are constructed of the wall 122. The wall 122 may couple to portions of the hard-sided wall 120 to secure the wall 122 through attachment mechanisms. The attachment mechanisms may pinch or clamp portions of the wall 122 therebetween. Additionally, or alternatively, the attachment mechanisms may include hooks, zippers, magnets, channels, straps, snaps, etc. In some instances, however, the wall 122 may extend around all sides of the expandable shelter 100.

The wall 122 may also include windows, doors, or other access points that provide access to the interior 118 of the expandable shelter 100. For instance, FIG. 1*E* illustrates that the wall 122 may include one or more window(s) 124. Additionally, stairs may couple to portions of the trailer 102 and/or the floor panels 106 to provide access into and out of the interior 118 of the expandable shelter 100.

Example Wall Connection Interface

Figure 2A:
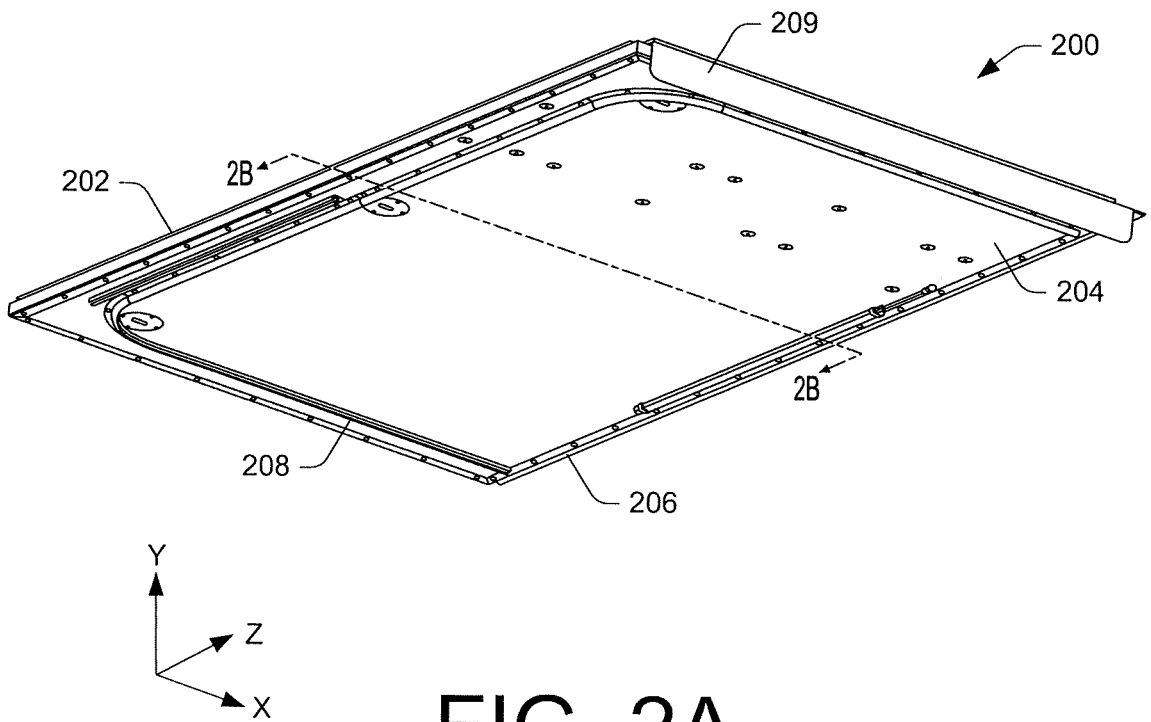
FIG. 2A is a perspective view of an example ceiling panel of the example expandable shelter of FIG. 1.
Figure 2B:
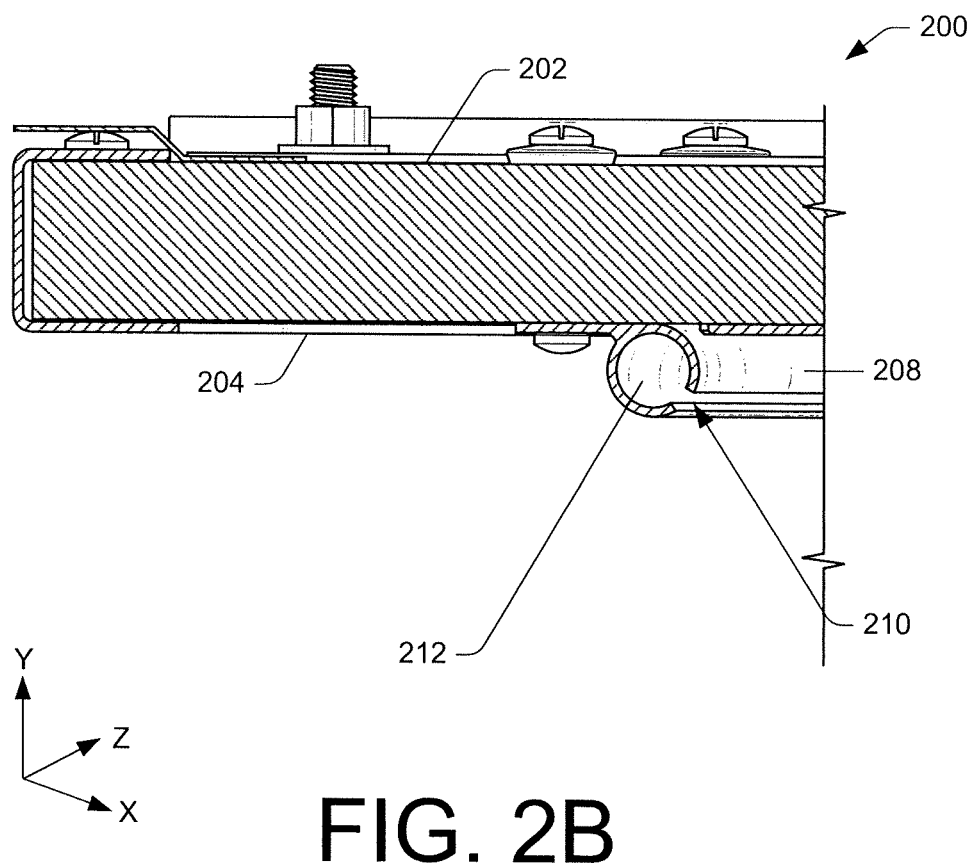
FIG. 2B is a cross-sectional view of the example ceiling panel of FIG. 2A, taken along line 2B-2B of FIG. 2A.

FIGS. 2A and 2B illustrate an example ceiling panel 200 (which may be similar to or represent the "ceiling panel(s) 106"). The ceiling panel 200 may include an exterior surface 202 as well as an interior surface 204 opposite the exterior surface 202. In the stowed state, the exterior surface 202 may represent portions of a lateral exterior of the expandable shelter 100, as shown in FIG. 1A. In the deployed state, the exterior surface 202 may represent portions of a top of the expandable shelter 100, as shown in FIG. 1D. The ceiling panel 200 may couple to portions of an upper frame of the expandable shelter 100 via a hinge 206 that allows the ceiling panel 200 to transition between stowed and deployed states.

The ceiling panel 200 includes a channel 208 disposed on the interior surface 204. The channel 208 may follow or traverse portions of a perimeter of the ceiling panel 200. That is, shown in FIG. 2A, the channel 208 is spaced inwardly from the perimeter of the ceiling panel 200 and may traverse a curvature of the ceiling panel 200. The channel 208 may therefore be interior to the perimeter of the ceiling panel 200. Discussed below, and shown in FIG. 5, the channel 208 may receive the wall 122 such that the wall 122 couples inboard of the exterior perimeter of the ceiling panel 200. When the expandable shelter 100 includes more than one ceiling panel 200, the wall 122 may continuously feed through respective channels 208 on the ceiling panel(s) 200. For instance, referring to FIG. 1E, the ceiling panels 106 may include the channels 208 that align and/or couple to allow the wall 122 to traverse a perimeter of the expandable shelter 100.

As shown in FIG. 2A, the channel 208 is not disposed on a side of the ceiling panel 200 including the hinge 206. Additionally, although FIG. 2A illustrates the channel 208 following a particular path at a certain offset from the perimeter of the ceiling panel 200, the channel 208 may take any shape, profile, path and be offset any distance from the perimeter of the ceiling panel 200. Additionally, the ceiling panel 200 may include other shapes or may be smaller or larger than shown in FIG. 2A.

The ceiling panel 200 may include weather seals to environmentally protect the interior 118 of the expandable shelter 100. The ceiling panel 200 may also include a flange 209 that engages, retains, or couples to a respective floor panel (e.g., the floor panel 110) in the stowed state to secure the floor panels within the stowed footprint of the expandable shelter 100.

FIG. 2B illustrates a partial cross-sectional view of the ceiling panel 200 taken along line 2B-2B of FIG. 2A. FIG. 2B illustrates the channel 208 disposed on the interior surface 204 of the ceiling panel 200. The channel 208 includes a slot 210 and an interior 212. The slot 210 allows a fastener disposed at a top of the wall 122 to feed through the channel 208. For instance, the fastener may include a bead or piping that is disposed within the interior 212 to couple the wall 122 to the channel 208.

FIG. 2B also illustrates that the ceiling panel 208 may comprise a SIP having at least a layer of insulation material sandwiched between two outer skins made of structural material.

Figure 3A:
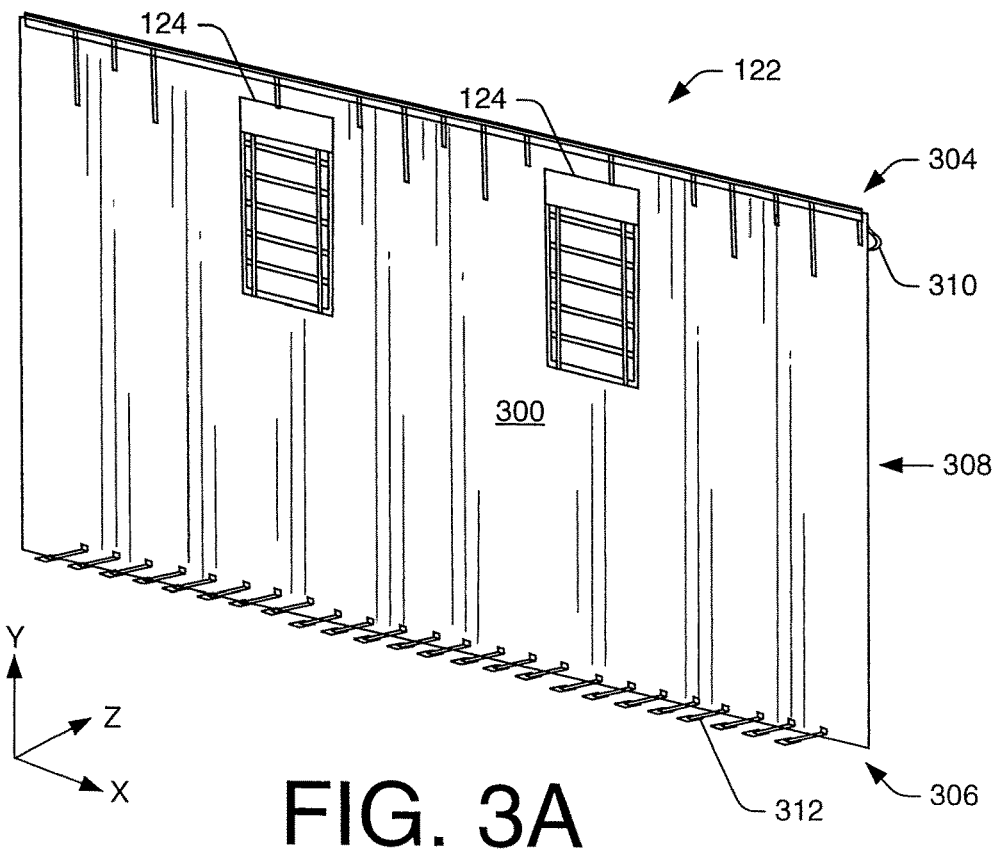
FIG. 3A is a perspective view of an exterior of an example wall of the example shelter of FIG. 1, showing an example window of the wall in a closed state.
Figure 3B:
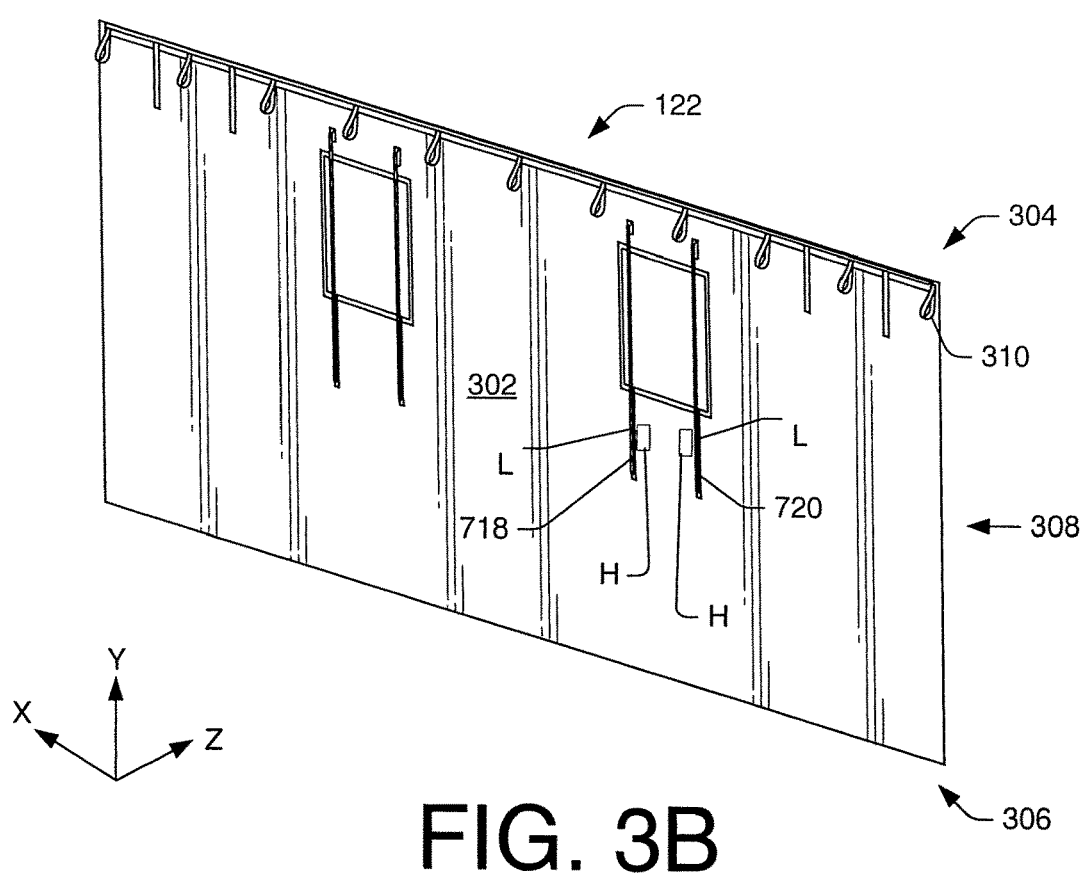
FIG. 3B is a perspective view of an interior of the example wall of FIG. 3A, showing the example window in a closed state.

FIGS. 3A and 3B illustrate a perspective view of an example wall 122. More particularly, FIG. 3A illustrates a perspective view of an exterior side 300 of the wall 122, while FIG. 3B illustrates an interior side 302 of the wall 122. The wall 122 may include a top 304, a bottom 306, and a wall portion 308 extending between the top 304 and the bottom 306.

At the top 304 on the interior side 302, the wall 122 may include straps or handles 310 to maneuver, position, or handle the wall 122. The top 304 of the wall 122 may also include a bead, piping, or other fastener (too small to see in FIGS. 3A and 3B, but illustrated and described in FIGS. 4 and 5) to secure the wall 122 to one or more ceiling panels 200.

At the bottom 306 on the exterior side 304, the wall 122 may include tie-downs 312 that couple the wall 122 to the expandable shelter 100. For instance, the tie-downs 312 may engage with straps coupled to the floor panels 110 and through tightening the tie-downs 312, the wall 122 may enclose the interior 118 of the expandable shelter 100. In some instances, the tie-downs 312 may couple to the wall 122 through fasteners (e.g., hooks, loops, slots, etc.) or being directly integrated with the wall 122 (e.g., sewn, adhesives, riveted, screwed, etc.).

The wall portion 308 may include the window(s) 124 or other openings to provide access between an exterior of the expandable shelter 100 and the interior 118 of the expandable shelter 100. As discussed in detail herein, the window 124 may include a shade that transitions between open and closed states. When closed, for instance, as shown in FIGS. 3A and 3B, shade may limit debris entering the expandable shelter 100, limit a visibility into the interior 118 of the expandable shelter 100, and/or limit light exiting the expandable shelter 100.

The wall 122 may be flexible to allow the wall 122 to traverse the channel 208 and enclose the interior 118 (see FIG. 1E). In some instances, the wall 122 may be a single piece of material or different sections of material may be fastened together to form the wall 122 (e.g., buckled, sewn, hook and loop elements such as Velcro®, clamps, zippers, etc.). Additionally, as the expandable shelter 100 may reside in extreme or harsh environments, materials of the wall 122 may be capable of withstanding wind, rain, hail, and/or debris and resist tears, punctures, ruptures, or splitting. The wall 122 may also include water-resistant materials (e.g., nylon, polyester, etc.), water-proof materials (e.g., Gore-Tex®, vinyl, etc.), rubbers, fabrics, projectile resistant materials (e.g., woven or non-woven synthetic materials such as Kevlar™, Twaron™, Dyneema™, etc.), or any combination thereof. Furthermore, the wall 122 may include materials to thermally insulate the interior 118 of the expandable shelter 100. When not deployed, the wall 122 may compactly fold or collapse. The window 124 may conveniently collapse with the wall 122 and may correspondingly unfold or deploy with the wall 122.

Figure 4:
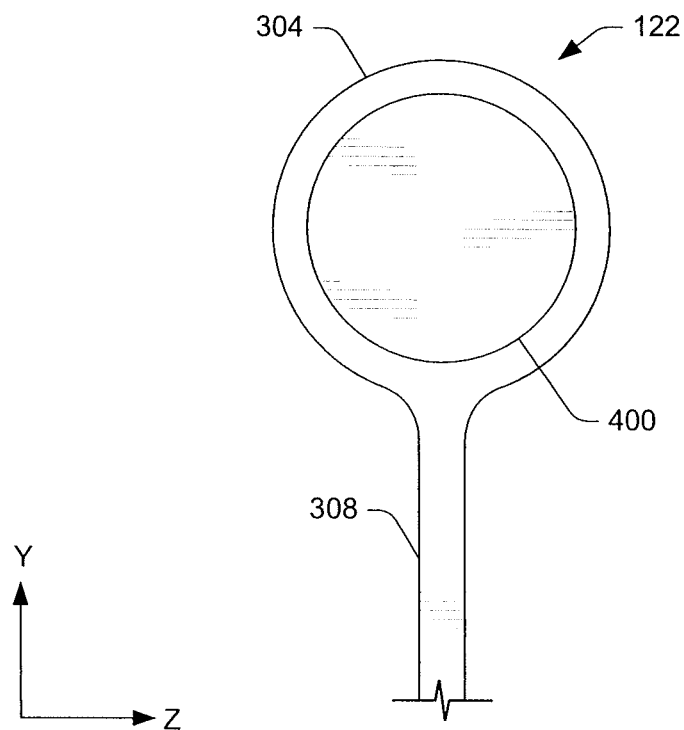
FIG. 4 is a side view of a top of the example wall of FIG. 3A.

FIG. 4 illustrates a side view of the top 304 of the wall 122. At the top 304, or substantially at the top 304, the wall 122 may include a fastener 400 sized and configured to be insertable within the channel 208. For instance, the fastener 400 may comprise a bead or piping that is configured to feed through the channel 208, within the interior 212, and around the perimeter of the expandable shelter 100. The wall portion 308 of the wall 122 may be sewn around the fastener 400 such that the fastener 400 is disposed within the wall 122.

Additionally, or alternatively, the fastener 400 may include slides, clasps, hooks, loops, buttons, and so forth. In some instances, the fastener 400 may include a boltrope sewn, integrated, or coupled to the wall 122. In such instances, the boltrope may be made of metal, fabric, or plastics capable of bending to allow the wall 122 to follow a curvature of the channel 208.

Figure 5:
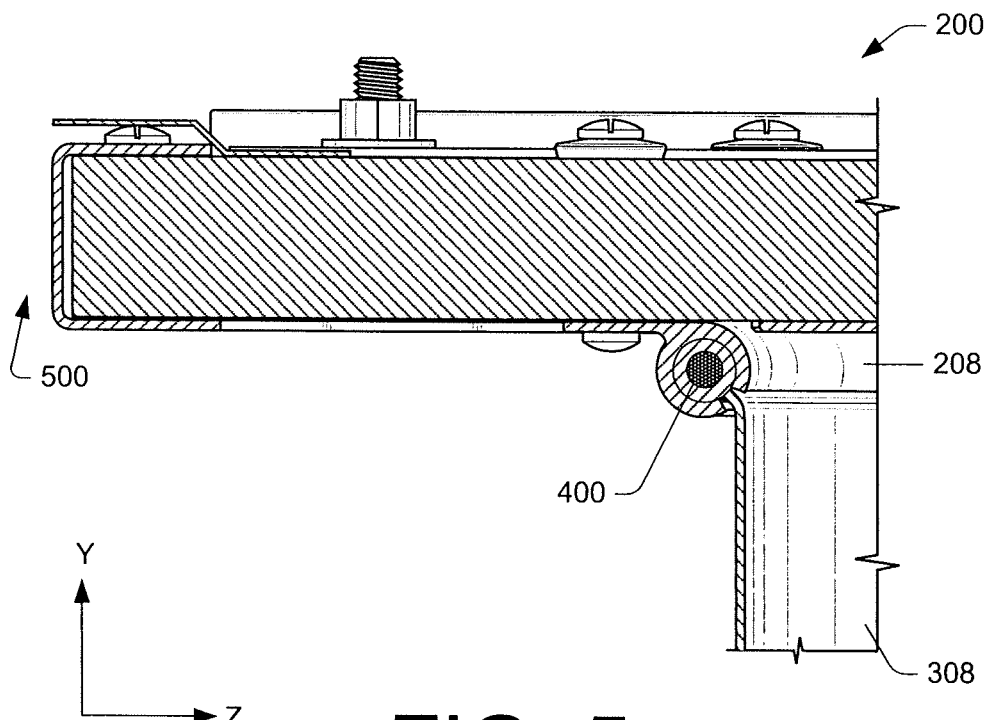
FIG. 5 is a cross-sectional view the example ceiling panel of FIG. 2A, showing the example wall of FIG. 3A coupled to the example ceiling panel.

FIG. 5 illustrates a cross-sectional view of the ceiling panel 200 similar to that shown in FIG. 2B. However, shown in FIG. 5, the wall 122 is coupled to the ceiling panel 200 via the fastener 400 engaging with the channel 208. Specifically, the fastener 400 is shown disposed within the interior 212 of the channel 208. Additionally, when inserted into the channel 208, the wall portion 308 is disposed through the slot 210 in the channel 208 in order to drape downward (in the Y-direction), toward the floor panels 110. As shown in FIG. 5, the wall 122 couples to the ceiling panel 200 interior to an outer perimeter 500 of the ceiling panel 208, thereby preventing water from entering the interior 118 of the expandable shelter 100.

In some instances, the wall 122 may couple to the ceiling panel 200 in the deployed state, while in other instances, the wall 122 may be configured to fold within the ceiling panels 200 (or the floor panels 110) in the stowed state. Additionally, while examples describe the wall 122 coupling to the ceiling panel 200 through use of the channel 208, in some instances, the wall 122 may otherwise be coupled. For instance, the wall 122 may couple to the ceiling panel 200 using zippers, hooks, buttons, straps, clamps, hook and loop (e.g., Velcro®), magnets, or any combination thereof.

Figure 6A:
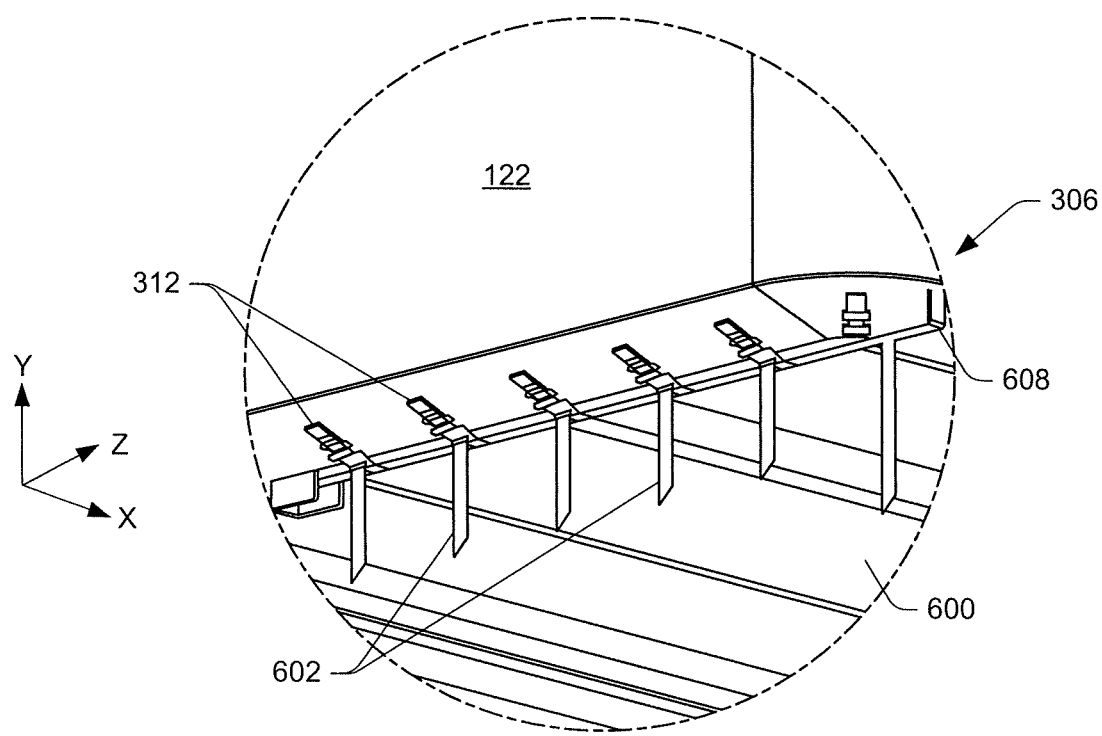
FIG. 6A is a perspective view of the bottom of the example wall of FIG. 3A, showing the example wall coupled to a bottom of the example expandable shelter of FIG. 1.
Figure 6B:
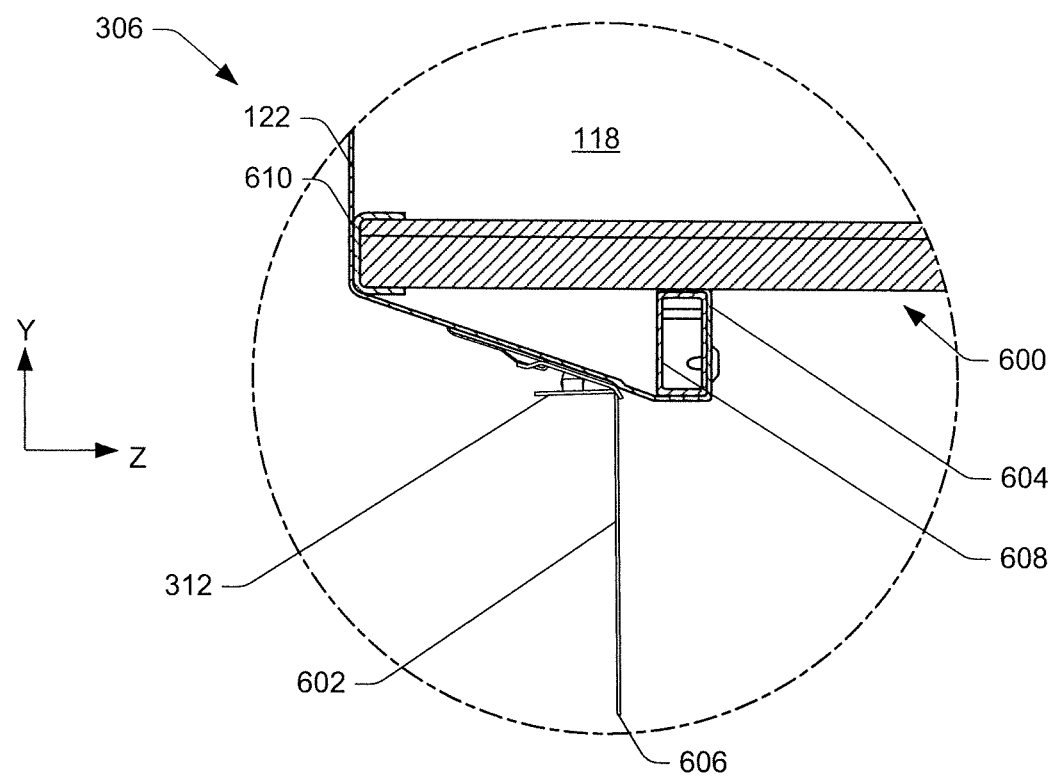
FIG. 6B is a cross-sectional view of the bottom of the example wall of FIG. 3A, showing the example wall coupled to the bottom of the expandable shelter of FIG. 1.

FIGS. 6A and 6B illustrate the coupling of the wall 122 to the expandable shelter 100, and more particularly, the coupling of the bottom 306 of the wall 122 to a floor panel 600 (which may represent or be similar to the floor panels 110) through use of the tie-downs 312. The tie-downs 312 engage with straps 602 coupled to the floor panel 600. For instance, the straps 602 may include a first end 604 coupled to the floor panel 600 and a second end 606 that feeds through respective tie-downs 312. After being inserted into the tie-downs 312, the second end 606 may be pulled to make the wall 122 taut through binding the strap 602 within the tie-down 312. For example, FIG. 6B illustrates the second end 606 hanging through the tie-down 312 after being pulled tight. The tie-downs 312 may include mechanisms (e.g., cam or ratchet) that prevent the straps 602 from loosening.

The wall 122 may include any number of tie-downs 312 and a corresponding number of straps 602. In some instances, the straps 602 may individually couple to the floor panel 600 at the first end 604 or may couple to one or more bars 608 on an underneath side of the floor panel 600. The inclusion of the one or more bars 608 may reduce a number of fasteners disposed into the floor panel 600 to secure the straps 602.

Although the tie-downs 312 and the straps 602 are shown coupled to the wall 122 and the floor panel 600, respectively, in some instances the wall 122 may include the straps 602 while the tie-downs 312 are coupled to the floor panel 600. Alternatively, a combination of tie-downs 312 and straps 602 may be disposed on the wall 122 and the floor panel 600, respectively. Additionally, while certain examples illustrated and described herein show specific attachment mechanisms for coupling the wall 122 and the floor panel 600 together, these examples are merely illustrative and other attachment mechanisms may be used for coupling the wall 122 to the expandable shelter 100.

Shown in FIG. 6B, the wall 122 may wrap over a perimeter 610 of the floor panel 600 in the deployed state. An end of the wall 122 may wrap beneath the underneath side of the floor panel 600. As such, rain, snow, or other debris may shed away from the interior 118 of the expandable shelter 100. In some instances, the perimeter 500 of the ceiling panel 200 may substantially align with the perimeter 610 of the floor panel 600. Alternatively, the perimeter 610 of the floor panel 600 may be disposed interior or exterior relative to the perimeter 500 of the ceiling panel 200.

Example Window

Figure 7B:
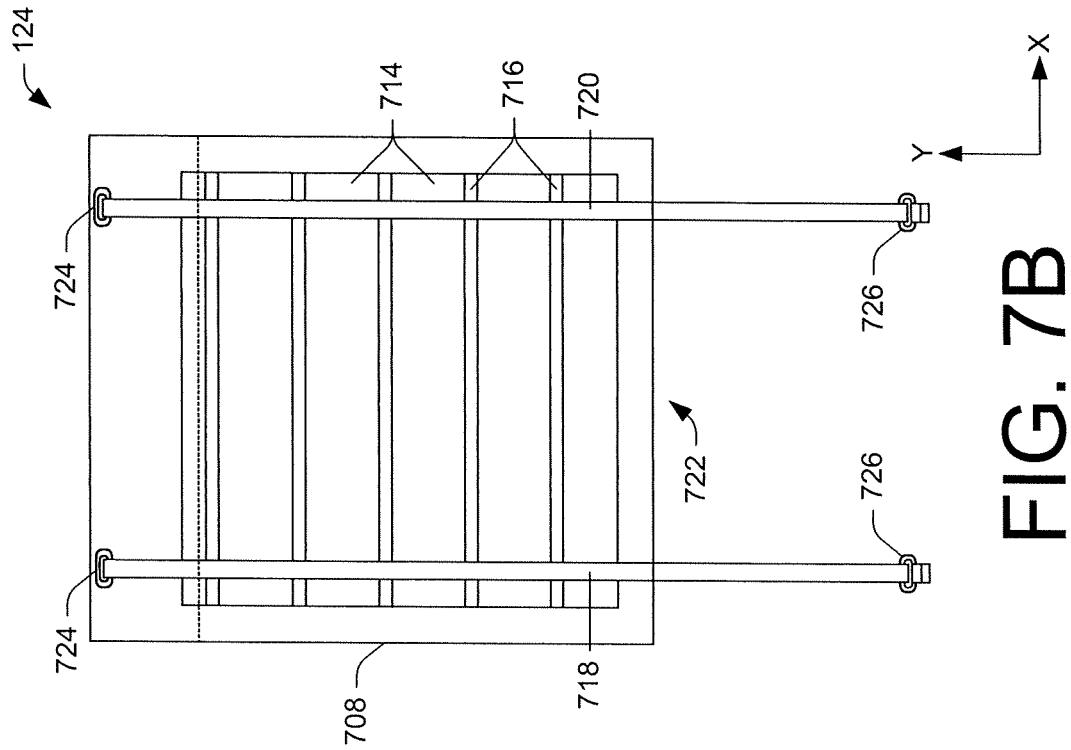
FIG. 7B is a front view of an example window of the example expandable shelter of FIG. 1, showing the example window in a closed state.
Figure 7A:
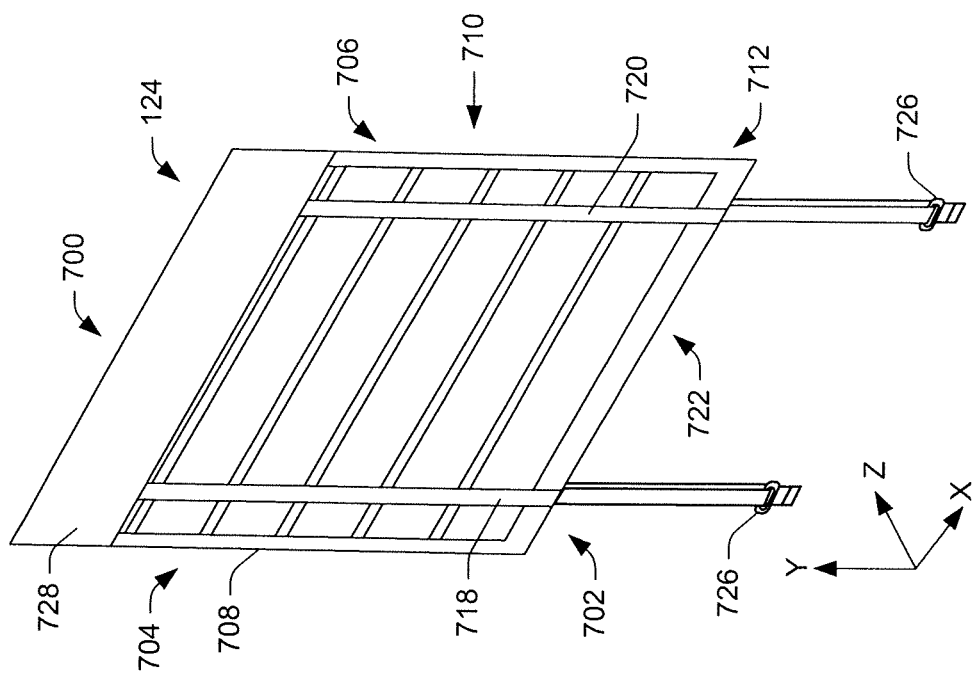
FIG. 7A is a front perspective view of an example window of the example expandable shelter of FIG. 1, showing the example window in a closed state.

FIGS. 7A and 7B illustrate a front perspective view and a front view of the window 124, respectively. In FIGS. 7A and 7B, the window 124 is shown removed or decoupled from the wall 122 to illustrate components of the window 124.

In some instances, the window 124 may be defined by a top 700, a bottom 702, a first lateral side 704, and a second lateral side 706. The window 124 may include a shade 708 disposed over a front of the window 124 which may seal and/or environmentally insulate the interior 118 of the expandable shelter 100. In some instances, the shade 708 may include substantially similar dimensions as the window 124 and may span between the top 700, the bottom, 702, the first lateral side 704, and the second lateral side 706 of the window 124. However, in some instances, the shade 708 may be sized larger than the window 124. The shade 708 may include an exterior side or surface 710 and an interior side or surface 712 (pointing behind the exterior surface 710) opposite the exterior surface 710.

The shade 708 may be configured to transition between a closed state and an open state. In the closed state, and as shown in FIGS. 7A and 7B, the shade 708 may cover the front of the window 124, however, as discussed later herein, when the shade 708 transitions to the open state, the interior 118 of the expandable shelter 100 may be exposed. In the closed state, the interior surface 712 of the shade 708 may face the interior 118 of the expandable shelter 100. Additionally, in some instances, hook-and loop elements (e.g., Velcro® C)), magnets, or other fasteners may be used to secure the shade 708 in the closed state. In the closed state, the shade 708 may prevent substantially all light from exiting the interior 118 of the expandable shelter 100.

In some instances, the shade 708 may include two substrates of material sewn together. For instance, the shade 708 may include water-resistant materials (e.g., nylon, polyester, etc.), water-proof materials (e.g., Gore-Tex®, vinyl, etc.), rubbers, fabrics, projectile resistant materials (e.g., woven or non-woven synthetic materials such as Kevlar™, Twaron™, Dyneema™, etc.), or any combination thereof. The shade 708 may also include materials that allow the shade 708 to easily transition between closed and open states. For instance, the shade 708 or the window 124 may include flexible materials that allow the shade 708 and window 124 to fold within the wall 122 in the stowed state of the expandable shelter 100.

The shade 708 may include supports, bars, or slats 714 and one or more gaps 716 interposed between adjacent slats 714. In some instances, the slats 714 may horizontally extended across a width (e.g., X-direction) of the shade 708 and may be spaced apart from one another along a height (e.g., Y-direction) of the shade 708. The slats 714 may comprise a piece of metal, plastic, or composite material coupled (e.g., sewn, fastened, adhered, etc.) to the shade 708. In some instances, the slats 714 may be sewn within one or more pouches or pockets of the shade 708 (at either the exterior surface 710 and/or the interior surface 712, or interposed between the exterior surface 710 and the interior surface 712). As discussed in detail herein, the combination of the slats 714 and the gaps 716 may assist in transitioning the shade 708 between the closed and open states. For instance, the slats 714 may provide structural support to allow the shade 708 to roll between the open and closed states, while the gaps 716 may allow the shade 708, and the slats 714, to roll when being raised (e.g., in the Y-direction).

The window 124 may include one or more lines used to transition the shade 708 between the open and closed states. For instance, the window 124 may include a first line 718 and a second line 720 disposed on opposing lateral sides of the window 124. The first line 718 may be disposed at or along the first lateral side 704 of the window 124 while the second line 720 may be disposed at or along the second lateral side 706 of the window 124.

As shown and discussed herein, the first line 718 and the second line 720 may extend from the interior 118 of the expandable shelter 100 and extend along the exterior surface 710 of the shade 708. In some instances, along the exterior surface 710, the first line 718 and/or the second line 720 may couple (e.g., adhered, fastened, sewn, etc.) to the shade 708. For instance, the first line 718 and/or the second line 720 made include nylon, polypropylene, polyester, or other fabric materials.

Figure 11:
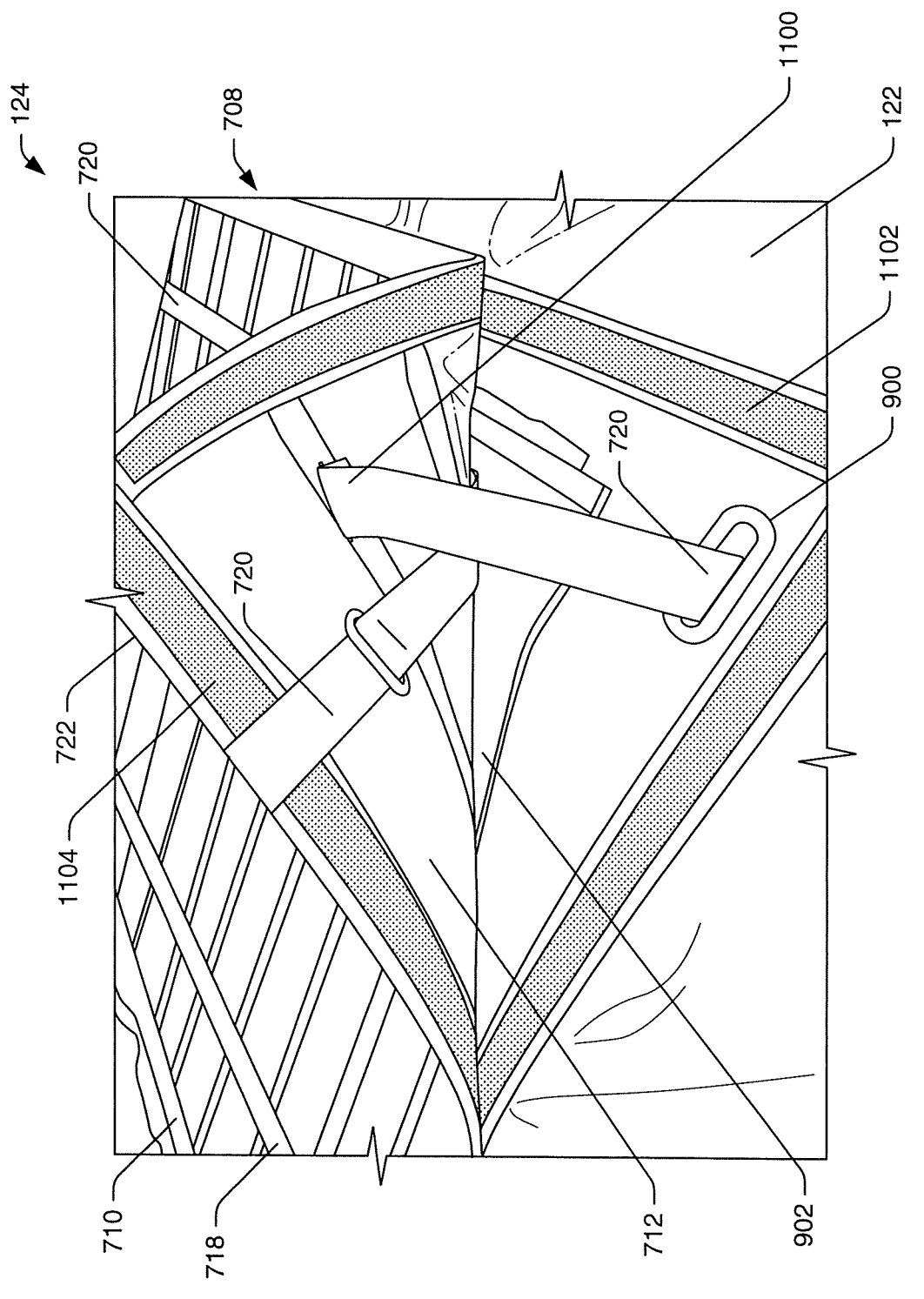
FIG. 11 is a perspective view showing an example window of the example expandable shelter of FIG. 1 transitioning between a closed state and an open state.

A first end of the first line 718 and a first end of the second line 720 may respectively couple (e.g., sewn) to the interior surface 712 of the shade 708 proximate to the top 700 of the window 124 (see respective first ends 1000,1002 of the first line 718 and second line 720 in FIG. 10A). In doing so, the first line 718 and the second line 720 may respectively curl over or wrap around a bottom end 722 of the shade 708 (see also FIG. 11 showing second line 720 wrapped around bottom end 722 of shade 708)). An opposite, respective second end of the first line 718 and the second line 720 may extend through one or more slots 724 located proximal to the top 700 of the window 124 and into the interior 118 of the expandable shelter 100. That is, the slots 724 may provide a passageway between the interior 118 and an exterior of the expandable shelter 100 for the first line 718 and the second line 720 to pass through. Within the interior 118, the second ends of the first line 718 and the second line 720 may loop through one or more fittings, pulleys, or rings 726 coupled (e.g., sewn) to the wall 122. After looping through the one or more rings 726, the first line 718 and the second line 720 may exit the interior 118 through one or more additional slots (not shown in FIGS. 7A and 7B) before coupling to the interior surface 712 of the shade 708 proximal to the bottom end 722. In this regard, FIG. 11 shows the second end 1100 of second line 720 exiting slot 900 and coupled (e.g., sewn) to the interior surface 712 of the shade 708 proximal to the bottom end 722, and second end of the first line 718 can be configured and arranged in a corresponding manner.

Accordingly, the first line 718 and the second line 720, when actuated, may provide a mechanism to raise and lower the shade 708 over portions of the window 124 and/or the wall 122. For instance, pulling the first line 718 and the second line 720 (from the interior 118 of the expandable shelter 100) in a downward direction (negative Y-direction) may cause the shade 708 to separate from the window 124 and/or the wall 122 and transition to the open state. For instance, pulling the first line 718 and the second line 720 may cause the material of the shade 708 to roll up towards the top 700 of the window 124. Consequently, as the shade 708 opens and as the second ends of the first line 718 and the second line 720 are coupled proximal to the bottom end 722 of the shade 708, the first line 718 and the second line 720 may roll up with the material of the shade 708. Pulling the first line 718 and the second line 720 in an opposite upward direction (positive Y-direction) may lower the shade over the window 124 and/or portions of the wall 122. In other words, and as illustrated in the subsequent figures, in the open state, as the first line 718 and the second line 720 are wrapped with the shade 708, actuating the first line 718 and the second line 720 in the upward direction may release the shade 708 from the open state to unroll the shade 708 over the window 124. As noted above, in the closed state, the shade 708 may be secured to the window 124 using hook and loop elements or other fasteners. However, upon actuation of the first line 718 and the second line 720 in the upward direction (i.e., to open the shade 708), the shade 708 may release from the fasteners and transition to the open state.

As the shade 708 rolls towards the top 700 of the window 124, in the open state, the shade 708 may be disposed above the top 700 of the window 124. To prevent water or other debris from entering the interior 118 (e.g., via the slots 724, for instance), the window 124 may include an awning or canopy 728. The canopy 728 is shown in dashed lines in FIG. 7B to illustrate components residing beneath the canopy 728, such as the slots 724. In some instances, and as discussed in detail herein, when the shade 708 transitions to the open state, the canopy 728 may deploy over the shade 708.

Figure 8B:
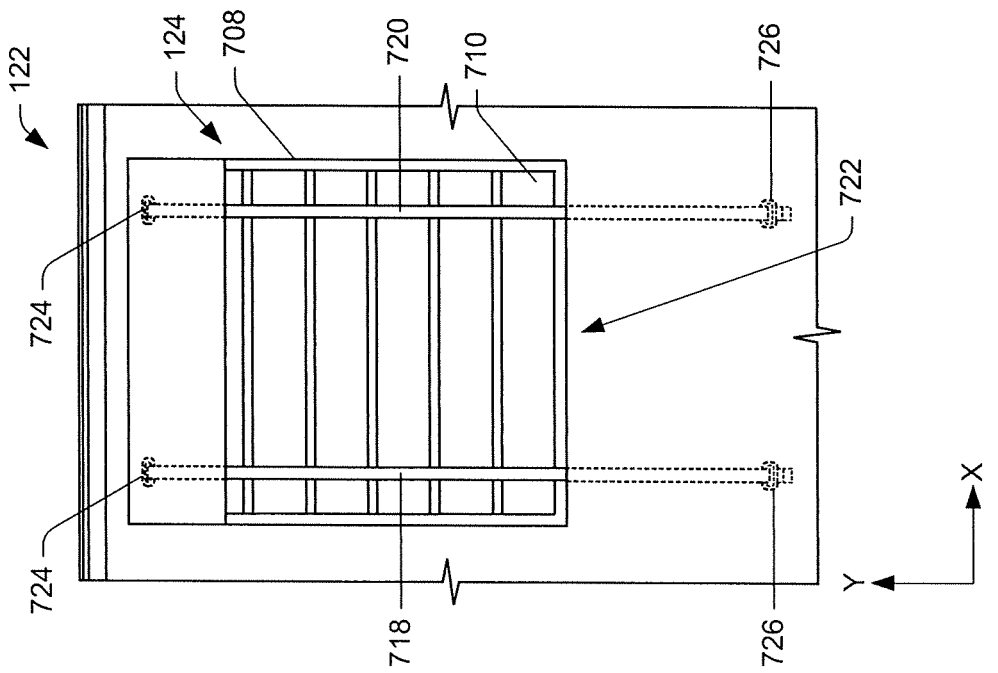
FIG. 8B is a front view of an example window coupled to an example wall of the example expandable shelter of FIG. 1, showing the example window in a closed state.
Figure 8A:
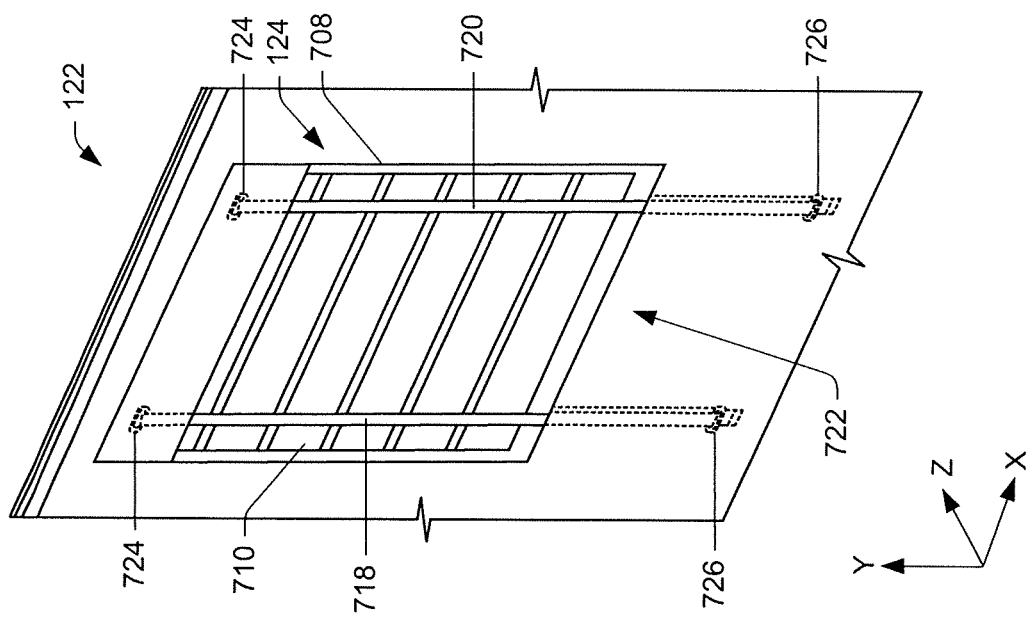
FIG. 8A is a front perspective view of an example window coupled to an example wall of the example expandable shelter of FIG. 1, showing the example window in a closed state.

FIGS. 8A and 8B illustrate exterior views of the window 124 coupled to the wall 122. More particularly, FIG. 8A is a front perspective view of the window 124 coupled to the wall 122, while FIG. 8B is a front view of the window 124 coupled to the wall 122. For instance, the window 124 may couple to the wall 122 via fasteners, being sewn, being adhered, and so forth. In FIGS. 8A and 8B, the shade 708 of the window 124 is shown in a closed state to limit visibility into an interior 118 of the expandable shelter 100. Additionally, certain components of the window 124 and/or the shade 708 are shown in dashed lines to illustrate their position behind one or more components of the wall 122, the window 124, and/or the shade 708. For instance, certain portions of the first line 718 and the second line 720 are shown in dashed lines to illustrate their position behind the wall 122 or within an interior 118 of the expandable shelter 100.

As illustrated, the first line 718 and the second line 720 may respectively loop through rings 726. The rings 726 may respectively couple (e.g., sewn, fastened, adhered, etc.) to an interior surface of the wall 122. That is, the dashed portions of the first line 718 and the second line 720 may indicate their position behind the wall 122 and/or the canopy 728, for instance. As discussed above, the first line 718 and the second line 720 may feed through the rings 726 in the downward direction (e.g., negative Y-direction) before looping back upward (e.g., in the positive Y-direction). The first line 718 and the second line 720 may then respectively extend through one or more slots in the window 124 and/or the wall 122 towards the exterior of the expandable shelter (e.g., negative Z-direction). The first line 718 and the second line 720 may then couple to the shade 708 proximal to the bottom end 722.

Additionally, an opposite end not coupled to the bottom end 722 of the shade 708 may feed through respective slots 724 located at the top 700 of the window 124 from within the interior 118 of the expandable shelter 100. The first line 718 and the second line 720 may then extend along the exterior surface 710 of the shade 708, loop around the bottom end 722 of the shade 708, and may couple to the shade 708 on the interior surface 712 proximal to the top 700.

Figure 9B:
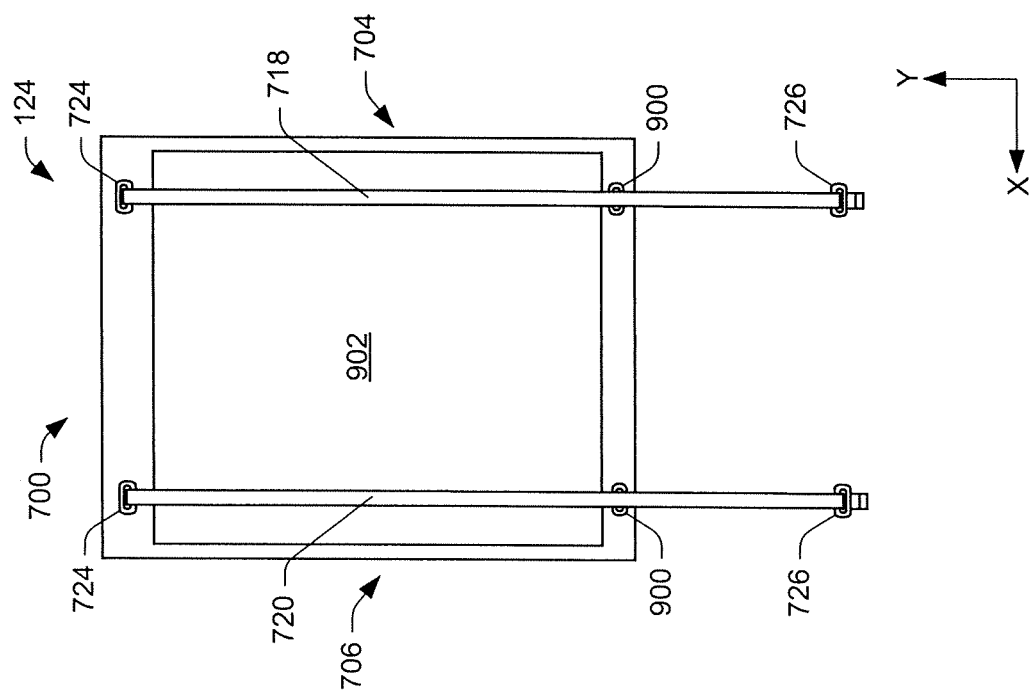
FIG. 9B is a rear view of an example window of the example expandable shelter of FIG. 1, showing the example window in a closed state.
Figure 9A:
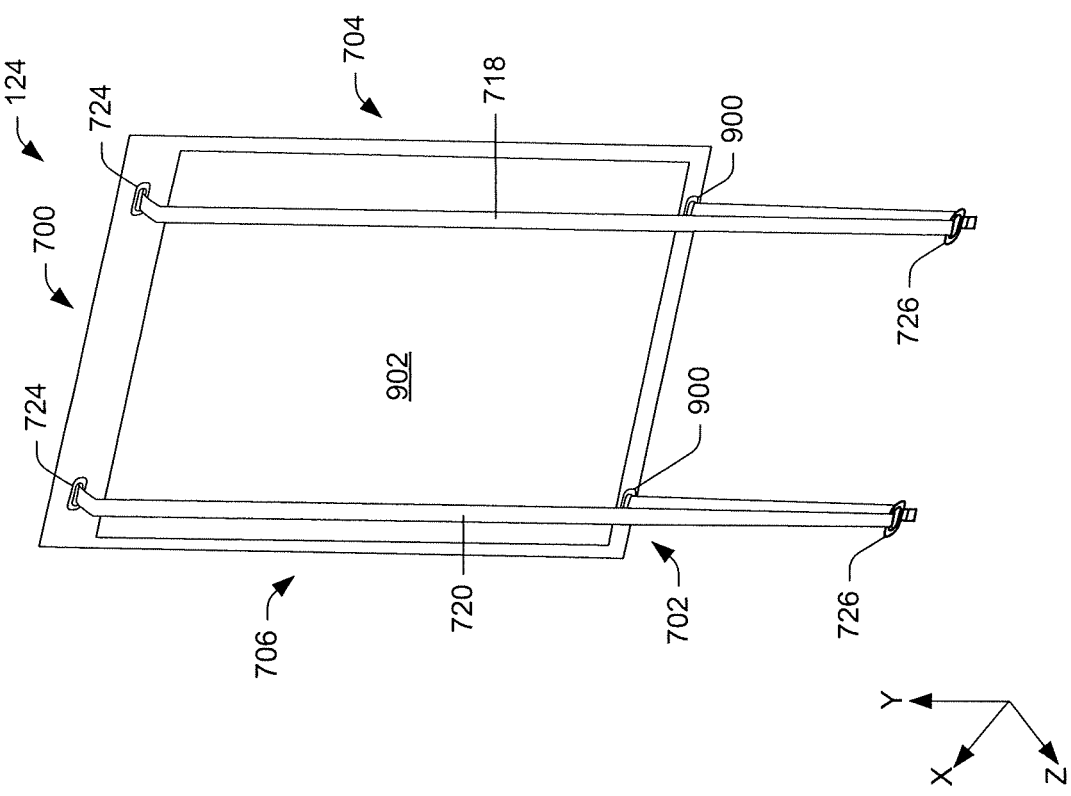
FIG. 9A is a rear perspective view of an example window of the example expandable shelter of FIG. 1, showing the example window in a closed state.

FIGS. 9A and 9B illustrate a rear perspective view and a rear view of the window 124, respectively. In FIGS. 9A and 9B, the window 124 is shown removed or decoupled from the wall 122 to illustrate components of the window 124. As discussed above, the first line 718 and the second line 720 may extend into the interior 118 of the expandable shelter 100. For instance, at the top 700 of the window 124, the first line 718 and the second line 720 may pass through the slots 724. When the window 124 couples to the wall 122, the slots 724 may provide a passageway between the exterior of the expandable shelter 100 and the interior 118 of the expandable shelter 100. In some instances, the slots 724 may include a grommet to limit a tearing of the window 124 or wall 122 and/or to reduce friction between the first line 718 and the window 124 or the second line 720 and the window 124. The first line 718 and the second line 720 may extend toward a bottom 702 of the window 124 (negative Y-direction) and may loop or extend through the rings 726, respectively, before extending out slots 900 and coupling to the bottom end 722 of a shade 708. When the window 124 couples to the wall 122, the slots 900 may provide a passageway between the exterior of the expandable shelter 100 and the interior 118 of the expandable shelter 100.

The window 124 may include a substantially transparent material 902 disposed between the top 700, the bottom 702, the first lateral side 704, and the second lateral side 706 of the window 124. The slots 724 may be disposed above the substantially transparent material 902 (Y-direction) such that when the shade 708 is in the open state (e.g., rolled up), the shade 708 is disposed above the substantially transparent material 902. The substantially transparent material 902 may provide visibility between the interior 118 of the expandable shelter 100 and an exterior of the expandable shelter 100. For instance, the substantially transparent material 902 may be clear, translucent, tinted, polarized, and/or partially occluded (e.g., screens or meshes that allow light and/or air to pass through). Without limitation, examples of "substantially transparent materials" may include plastic sheets or films (e.g., vinyl), glass panes, plastic or wire meshes or screens (e.g., vinyl-coated polyester), etc. Moreover, in some instances, the window 124 may not include the substantially transparent material 902, but instead, may include an opening. Here, one or more interchangeable screens may couple to the window 124 and/or the wall 122 so as to be disposed over the opening. The interchangeable screens (e.g., mesh, non-permeable, tinted, etc.) may allow a user may swap out or change the screen depending on the environment of the expandable shelter 100. In some instances, the interchangeable screens may couple to the window 124 and/or the wall 122 via hook and loop elements (e.g., Velcro®). Moreover, in some instances, the substantially transparent material 902 may comprise a mesh-screen material and a removably coupled vinyl substantially transparent material coupled to the window 124 and/or the wall 122 over the mesh-screen. Here, the vinyl substantially transparent material may be removeable to allow air flow into and out of the interior 118 while also preventing debris from entering the interior 118 of the expandable shelter 100.

FIGS. 10A and 10B illustrate a rear view of the window 124 coupled to the wall 122. More particularly, FIG. 10A is a rear perspective view of the window 124 coupled to the wall 122, while FIG. 10B is a rear view of the window 124 coupled to the wall 122. In FIG. 10A, portions of a first line 718 and a second line 720 are shown in dashed lines to illustrate their position behind one or more components of the wall 122, the window 124, and/or a shade 708.

As illustrated, the first line 718 and the second line 720 may extend through the slots 724 and into the interior 118 of the expandable shelter 100. After looping through the rings 726 that couple to the interior surface 302 of the wall 122, the first line 718 and the second line 720 may extend through the slots 900 and exit the interior 118 of the expandable shelter 100. The first line 718 and the second line 720 may then couple to the bottom end 722 of the shade 708. An alternate end, such as the first end 1000 of the first line 718 and the first end 1002 of the second line 720 may couple (e.g., sewn) to the interior surface 712 of the shade 708 proximal to the top 702 of the window 124. For instance, the first end 1000 and the second end 1002 may couple to the interior surface 712 of the shade 708 after extending down the exterior surface 710 of the shade 708 and wrapping over the bottom end 722 of the shade 708.

In some instances, the first line 718 and/or the second line 720 may include handles or other grasping points within the interior 118 that allow a user to conveniently grab the first line 718 and/or the second line 720 for opening and closing the shade 708.

FIG. 11 is a perspective view showing a transition of the shade 708 of the window 124 between the closed state and the open state. As discussed above, the first line 718 and the second line 720 may extend along the exterior surface 710 of the shade 708, may extend over the bottom end 722 of the shade 708, and may extend along the interior surface 712 of the shade 708. The first end 1000 of the first line 718 and the first end 1002 of the second line 720 may then couple to the interior surface 712 of the shade 708 proximal to the top of the shade 708 and/or the window 124. After looping through the rings 726 (see FIGS. 10A and 10B, for instance), another end of the first line 718 and the second line 720 may exit the slot 900 and couple to the interior surface 712 of the shade 708. For instance, FIG. 11 illustrates that a second end 1100 of the second line 720 may exit the slot 900 and couple (e.g., sewn) to the interior surface 712 of the shade 708 proximal to the bottom end 722. Additionally, although FIG. 11 illustrates the second end 1100 of the second line 720 coupling to the shade 708, the first line 718 may include a similar second end that couples to the interior surface 712 of the shade 708.

The window 124 and/or the wall 122 may include a first attachment mechanism 1102 disposed around a substantially transparent material 902 of the window 124, or around a perimeter of the window 124. The first attachment mechanism 1102 may engage with a second attachment mechanism 1104 disposed on the interior surface 712 around a perimeter of the shade 708. In some instances, the first attachment mechanism 1102 and the second attachment mechanism 1104 may include engaging hook-and loop elements (e.g., Velcro®), magnets, or buttons. In some instances, an engagement or coupling between the first attachment mechanism 1102 and the second attachment mechanism 1104 may secure the shade 708 in the closed state. However, upon actuation of the first line 718 and the second line 720 to open the shade 708, the shade 708 may release and transition to the open state. That is, pulling the first line 718 and the second line 720 in the Y-direction causes the shade 708 to open.

In some instances, the first attachment mechanism 1102 and/or the second attachment mechanism 1104 may extend around less than all sides of the window 124 and/or the shade 708, respectively. For instance, the first attachment mechanism 1102 and the second attachment mechanism 1104 may not be disposed at the top 700 of the window 124.

Additionally, FIG. 11 illustrates that the slots 900 may be disposed interior to a perimeter of the window 124 and or interior to the perimeter of the shade 708. In doing so, in the closed state, the shade 708 may cover the slot(s) 900 to seal and/or thermally insulate the interior 118 of the expandable shelter 100. Additionally, disposing the slots 900 interior to the perimeter of the window 124 may prevent light from exiting the interior 118.

Figure 12:
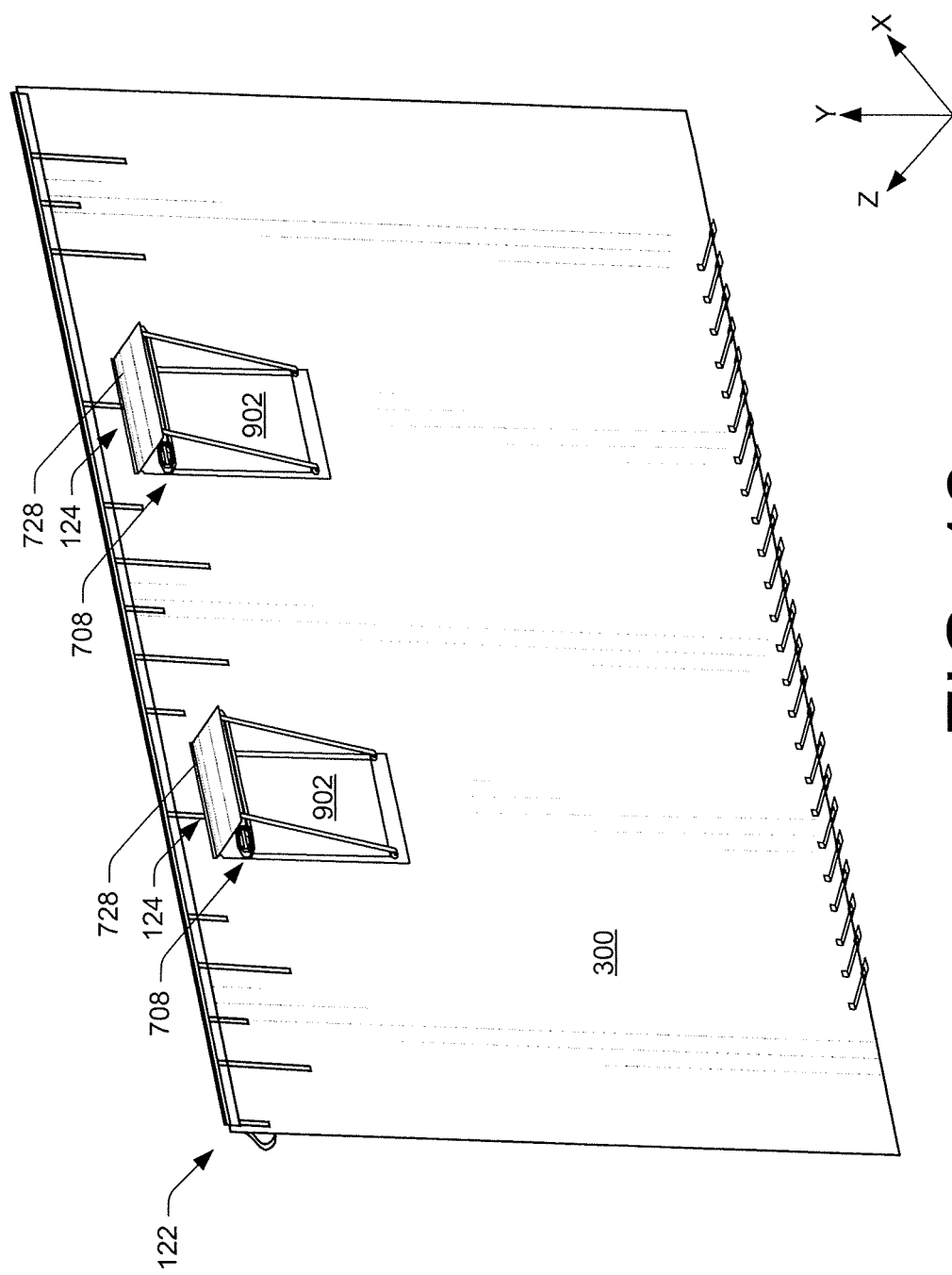
FIG. 12 is a perspective view of the exterior of an example wall of the example expandable shelter of FIG. 1, showing an example window of the expandable shelter of FIG. 1 in an open state.

FIG. 12 is a perspective view of the exterior surface 300 of the wall 122, showing the shades 708 of the windows 124 in an open state. As shown in FIG. 12, in the open state, the shades 708 may roll up to a position above the substantially transparent material 902 of the window 124. In some instances, the shade 708 may wind or roll in a vertical (Y-direction). Additionally, when rolled up, the shade 708 may reside beneath or under the canopy 728 of the window 124.

Figure 13A:
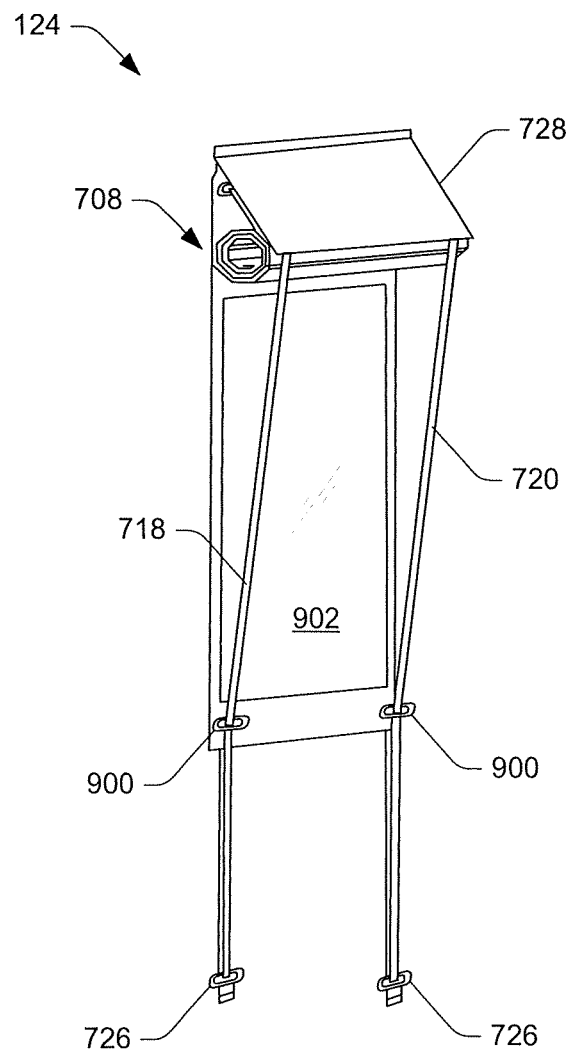
FIG. 13A is a front perspective view of an example window of the example expandable shelter of FIG. 1, showing the example window in an open state.
Figure 13B:
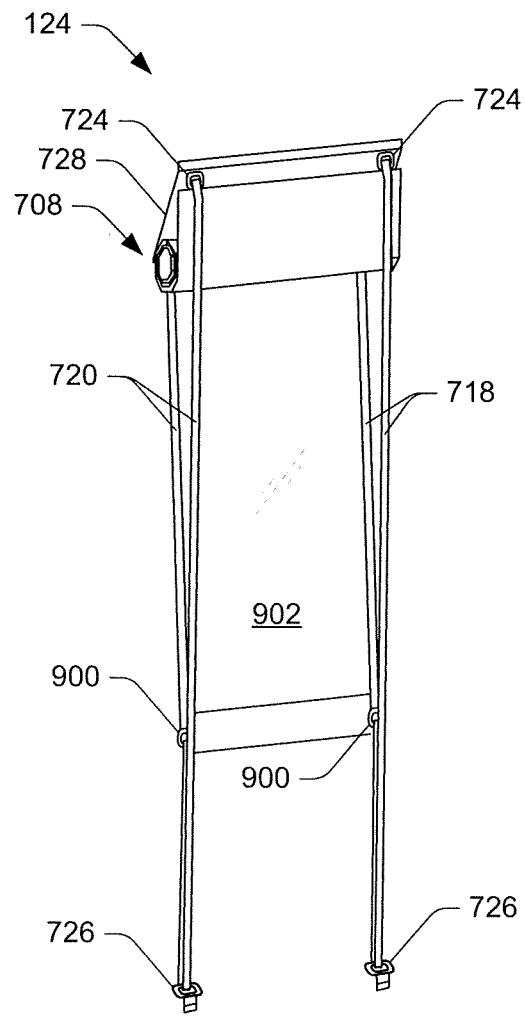
FIG. 13B is a rear perspective view of an example window of the example expandable shelter of FIG. 1, showing the example window in an open state.

FIGS. 13A and 13B illustrate perspective views of the shade 708 of the window 124 in an open state. More particularly, FIG. 13A illustrates a front perspective view of the window 124 showing the shade 708 in the open state, while FIG. 13B illustrates a rear perspective view of the window 124 showing the shade 708 in the open state. As shown, in the open state, and through actuating the first line 718 and the second line 720 (e.g., pulling in the negative Y-direction), the shades 708 may conveniently roll up to a position above the substantially transparent material 902 of the window 124. Additionally, in the open state, the canopy 728 of the window may be disposed over the shade 708. In some instances, as the shade 708 rolls up to a position beneath the canopy 728, the canopy 728 may deploy as the shade 708 transitions to the open state. In other words, the shade 708 may be pulled under the canopy 728 (via pulling the first line 718 and the second line 720) and causes the canopy 728 to deploy in the Z-direction. Conversely, when the shade 708 is pulled down (e.g., to the closed state), the canopy 728 may transition back.

As the second ends of the first line 718 and the second line 720 couple to the shade 708 (e.g., the second end 1002), as the shade 708 opens, the first line 718 and the second line 720 may roll up with the material of the shade 708. Accordingly, actuating the first line 718 and the second line 720 an upward direction (e.g., positive Y-direction), may lower the shade 708 over the substantially transparent material 902. In other words, from the open state as shown in FIGS. 13A and 13B, pulling the first line 718 and the second line 720 in an upward direction to the closed state may lower the shade 708 over the substantially transparent material 902. The first line 718 and the second line 720 may maneuver through the slots 724, the slots 900, and the rings 726. As the shade 708 lowers to the closed state, the shade 708 may unroll given that the second ends (e.g., the second end 1100) are coupled proximal to the bottom end 722 of the shade 708. The bottom end 722 of the shade 708 may pull taut against the window 124 and engage the first attachment mechanism 1102 on the window 124 and/or the wall 122 and the second attachment mechanism 1104 on the shade 708.

Additionally, when raised to a desired height, the shade 708 may secure to the window 124 or other portions of the expandable shelter 100 to prevent the shade 708 from closing. For instance, the second attachment mechanism 1104 on the shade 708 may engage with a corresponding attachment mechanism on the canopy 728. Additionally, or alternatively, the shade 708 may secure in closed state via one or more straps located on the exterior surface 300 of the wall 122. It is also possible to secure the shade 708 in its opened position or any partially opened position by securing the first and second lines 718,720 to a fixed anchor point such as to the interior side/surface 302 of the wall 122 (see also FIG. 3B) using any suitable fastening means or fastening device such as a snap device, a hook-and-loop fastening element H,L with its hook H and loop L elements connected respectively to the interior side/surface 302 of the wall 122 and the line 718,720 (or vice versa), or any other suitable clip, ring, or other hardware, fastener, or fastening device for fixedly securing the lines 718,720 in an immovable position relative to the wall 122.

Figure 14:
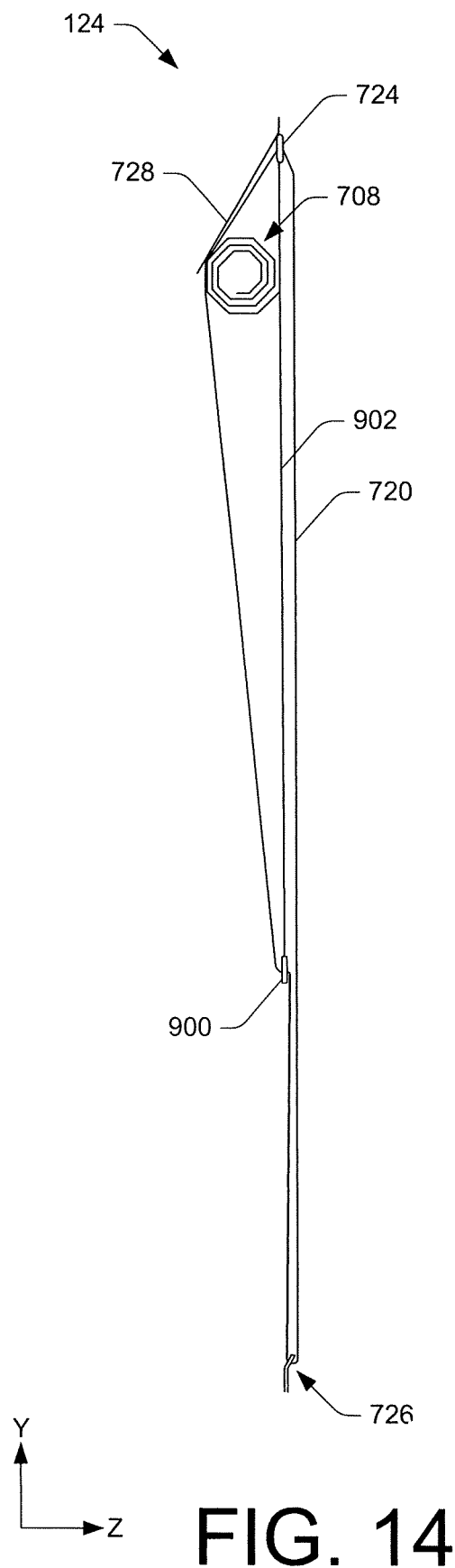
FIG. 14 is a side view of an example window of the example expandable shelter of FIG. 1, showing the example window in an open state.

FIG. 14 illustrates a side view of the window 124 and/or the shade 708 in an open state. FIG. 14 also illustrates the window 124 decoupled from a wall 122 to illustrate components of the window 124, and the routing of the second line 720 through the slot 724, the ring 726, and/or the slot 900. The routing of the second line 720 may also be representative of the routing of the first line 718 through the slot 724, the ring 726, and/or the slot 900.

As illustrated, the second line 720 may extend through the slot 724, from an exterior of the expandable shelter 100 towards the interior 118 of the expandable shelter 100. Within the interior 118, the second line 720 may loop through the ring 726 (in the negative Y-direction). The second line 720 may then extend from the ring 726 towards the slot 900 (in the positive Y-direction), and may loop through the slot 900 towards the exterior of the expandable shelter 100. Noted above, the first end 1002 may couple to the proximal to the top end of the shade 708 and the second end 1102 may couple proximal to the bottom end 722 of the shade 708.

While the shade 708 is in the open state, the second line 720 is wound within the shade 708 and to close the shade 708, the second line 720 (and the first line 718) may be pulled upward (e.g., positive Y-direction), thereby causing the shade 708 to unraveling from the open state as shown in FIG. 14.

FIG. 14 further illustrates the canopy 728 opening and being disposed above the shade 708.

Figure 15A:
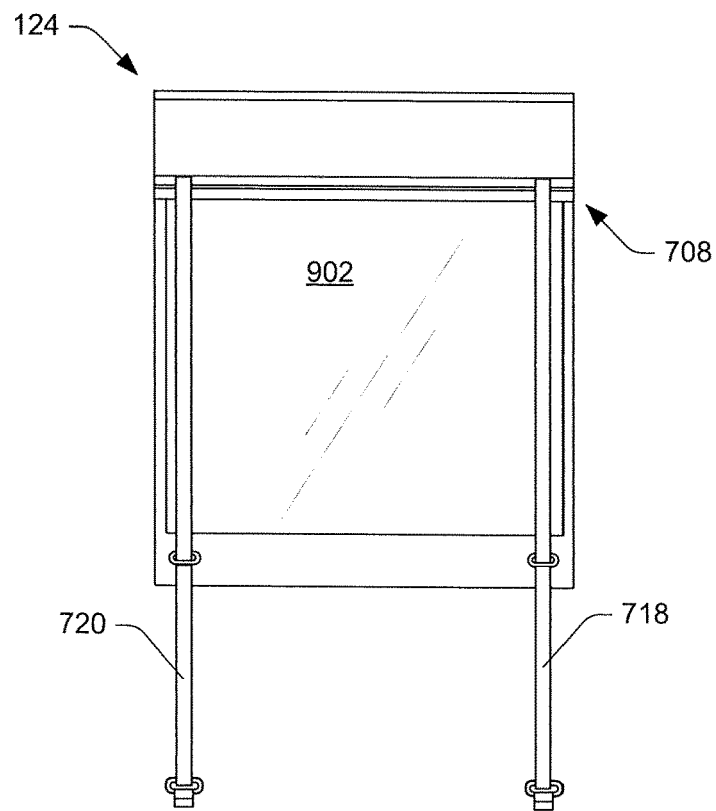
FIG. 15A is a front view of an example window of the example expandable shelter of FIG. 1, showing the example window in an open state.
Figure 15B:
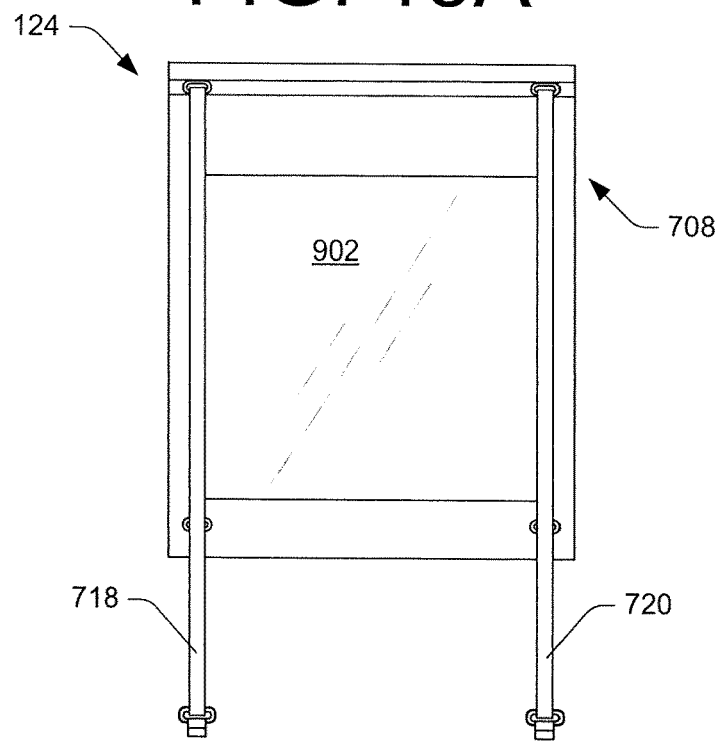
FIG. 15B is a rear view of an example window of the example expandable shelter of FIG. 1, showing the example window in an open state.

FIGS. 15A and 15B illustrate the shade 708 of the window 124 in an open state. More particularly, FIG. 15A illustrates a front view of the window 124 showing the shade 708 in the open state, while FIG. 15B illustrates a rear view of the window 124 showing the shade 708 in the open state. In the open state, the shade 708 may be disposed above a top of the substantially transparent material 902 in a compactly rolled state.

CONCLUSION

While various examples and embodiments are described individually herein, the examples and embodiments may be combined, rearranged and modified to arrive at other variations within the scope of this disclosure. In addition, although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:
1. An expandable shelter comprising:
a top;
a ceiling panel that unfolds from the top;
a bottom;
a floor panel that unfolds from the bottom; and
a flexible sidewall including:
    a first end coupled to the ceiling panel;
    a second end opposite the first end, the second end coupled to the floor panel;
    a wall portion extending between the first end and the second end;
    a window disposed in the wall portion;

a shade disposed over the window, the shade configured to transition between a closed state and an open state; and a first line and a second line coupled to the shade, wherein the first line and the second line extend between an interior of the expandable shelter on an interior side of said wall portion and an exterior of the expandable shelter on an exterior side of said wall portion, and wherein actuating the first line and the second line transition the shade between the closed state and the open state.

2. The expandable shelter of claim 1, wherein:
the shade includes a shade top and a shade bottom;
the first line includes:
   a first end coupled proximal to the shade top; and
   a second end coupled proximal to the shade bottom; and
the second line includes:
   a first end coupled proximal to the shade top; and
   a second end coupled proximal to the shade bottom.

3. The expandable shelter of claim 1, wherein:
the window further includes:
   a sheet of substantially transparent material;
   a first slot and a second slot disposed above the substantially transparent material; and
   a third slot and a fourth slot disposed below the substantially transparent material; and
the first line extends through the first slot and the third slot and the second line extends through the second slot and the fourth slot.

4. The expandable shelter of claim 1, wherein:
the shade includes slats extending horizontally across at least a portion of a width of the shade, the slats being disposed above one another along at least a portion of a height of the shade; and
adjacent ones of said slats are separated by a gap distance.

5. An expandable system comprising:
a top;
a bottom;
a flexible sidewall coupled to at least one of the top or the bottom, the flexible sidewall including an interior surface and an exterior surface opposite the interior surface;
a window disposed on the flexible sidewall; and
a shade including an interior surface and an exterior surface opposite the interior surface, the shade configured to transition between a closed state and open state via a first line and a second line, wherein actuating the first line and the second line in a first direction transitions the shade from the closed state to the open state and actuating the first line and the second line in a second direction transitions the shade from the open state to the closed state, and wherein in the closed state, the interior surface of the shade couples to the exterior surface of the flexible sidewall;
wherein the window comprises a sheet of substantially transparent material, the expandable system further comprising:
a first slot and a second slot disposed above the shade; and a third slot and a fourth slot disposed below the substantially transparent material,
wherein the first line extends through the first slot and the third slot, and the second line extends through the second slot and the fourth slot.

6. The expandable system of claim 5, wherein:
the shade includes a shade top and a shade bottom;
the first line includes:
   a first end coupled proximal to the shade top on the interior surface of the shade; and
   a second end coupled proximal to the shade bottom on the interior surface of the shade; and
the second line includes:
   a first end coupled proximal to the shade top on the interior surface of the shade; and
   a second end coupled proximal to the shade bottom on the interior surface of the shade.

7. The expandable system of claim 6, wherein:
a portion of the first line extends along at least a portion of the interior surface of the shade and at least a portion of the exterior surface of the shade; and
a portion of the second line extends along at least a portion of the interior surface of the shade and at least a portion of the exterior surface of the shade.

8. The expandable system of claim 7, wherein:
the first line is disposed on a first lateral side of the shade; and
the second line is disposed on a second lateral side of the shade.

9. The expandable system of claim 5, wherein:
the expandable system further comprises a first ring and a second ring coupled to the interior surface of the flexible sidewall; and
the first line extends through the first ring and the second line extends through the second ring.

10. The expandable system of claim 5, wherein the window comprises a mesh screen, the expandable system further comprising:
a first attachment mechanism disposed around at least a portion of a perimeter of the mesh screen; and
a sheet of substantially transparent material for selectively covering the mesh screen, the sheet of substantially transparent material including a second attachment mechanism disposed around a least a portion of a perimeter of the sheet of substantially transparent material, the second attachment mechanism engaging the first attachment mechanism.

11. The expandable system of claim 5, wherein the window includes a first attachment mechanism disposed at least partially around a perimeter of the window and the shade includes a second attachment mechanism disposed at least partially around a perimeter of the shade, the second attachment mechanism engaging the first attachment mechanism.

* * * * *